US010995681B2

(12) United States Patent
Sueoka et al.

(10) Patent No.: US 10,995,681 B2
(45) Date of Patent: May 4, 2021

(54) COMBUSTION CONTROL DEVICE FOR ENGINE

(71) Applicant: Mazda Motor Corporation, Hiroshima (JP)

(72) Inventors: Masanari Sueoka, Hiroshima (JP);
Junichi Taga, Higashihiroshima (JP);
Hideki Omori, Hiroshima (JP); Keiji Maruyama, Hiroshima (JP); Tatsuhiro Tokunaga, Aki-gun (JP); Takuya Ohura, Hiroshima (JP); Toru Miyamoto, Higashihiroshima (JP);
Tomohiro Nishida, Hiroshima (JP);
Kenji Tanimura, Hiroshima (JP);
Shinji Takayama, Hiroshima (JP);
Yusuke Kawai, Hiroshima (JP);
Atsushi Inoue, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/808,695

(22) Filed: Mar. 4, 2020

(65) Prior Publication Data

US 2020/0318555 A1  Oct. 8, 2020

(30) Foreign Application Priority Data

Apr. 4, 2019  (JP) .............. JP2019-072069

(51) Int. Cl.
*F02D 13/02* (2006.01)
*F02D 41/00* (2006.01)
*F02D 41/38* (2006.01)

(52) U.S. Cl.
CPC ....... *F02D 13/0261* (2013.01); *F02D 41/006* (2013.01); *F02D 41/0007* (2013.01);
(Continued)

(58) Field of Classification Search
CPC .. F02D 13/02; F02D 13/0261; F02D 41/0007; F02D 41/006; F02D 41/38; F02D 2041/389; F02D 2200/04
See application file for complete search history.

(56) References Cited

U.S. PATENT DOCUMENTS

| | | |
|---|---|---|
| 2007/0088487 A1 | 4/2007 | Lahti et al. |
| 2016/0377013 A1 | 12/2016 | Yamashita et al. |
| 2018/0334998 A1 | 11/2018 | Inoue et al. |

FOREIGN PATENT DOCUMENTS

JP  H08232729 A  9/1996

OTHER PUBLICATIONS

Hui, X. et al., "Study on spark assisted compression ignition (SACI) combustion with positive valve overlap at medium-high load," Applied Energy, vol. 101, 2013, 12 pages.
(Continued)

*Primary Examiner* — Hieu T Vo
(74) *Attorney, Agent, or Firm* — Alleman Hall Creasman & Tuttle LLP

(57) ABSTRACT

A combustion control device for an engine includes a plurality of cylinders, a surge tank disposed in an intake path to the cylinders, an independent intake passage connecting the surge tank and an intake port of each of the cylinders, a fuel injection valve that is disposed for each of the cylinders and that supplies fuel into each of the cylinders, and a control unit that controls a fuel injection amount of each of the fuel injection valves according to an engine operating state. The control unit corrects a target fuel injection amount of each of the cylinders, the target fuel injection amount being determined according to the engine operating state, based on a re-intake correction amount set in each of the cylinders according to a re-intake amount of intake air from the intake port in internal EGR in each of the cylinders.

10 Claims, 17 Drawing Sheets

(52) U.S. Cl.
CPC ........ *F02D 41/38* (2013.01); *F02D 2041/389* (2013.01); *F02D 2200/04* (2013.01)

(56) References Cited

OTHER PUBLICATIONS

European Patent Office, Extended European Search Report Issued in Application No. 20160392.5, dated Aug. 13, 2020, Germany, 8 pages.

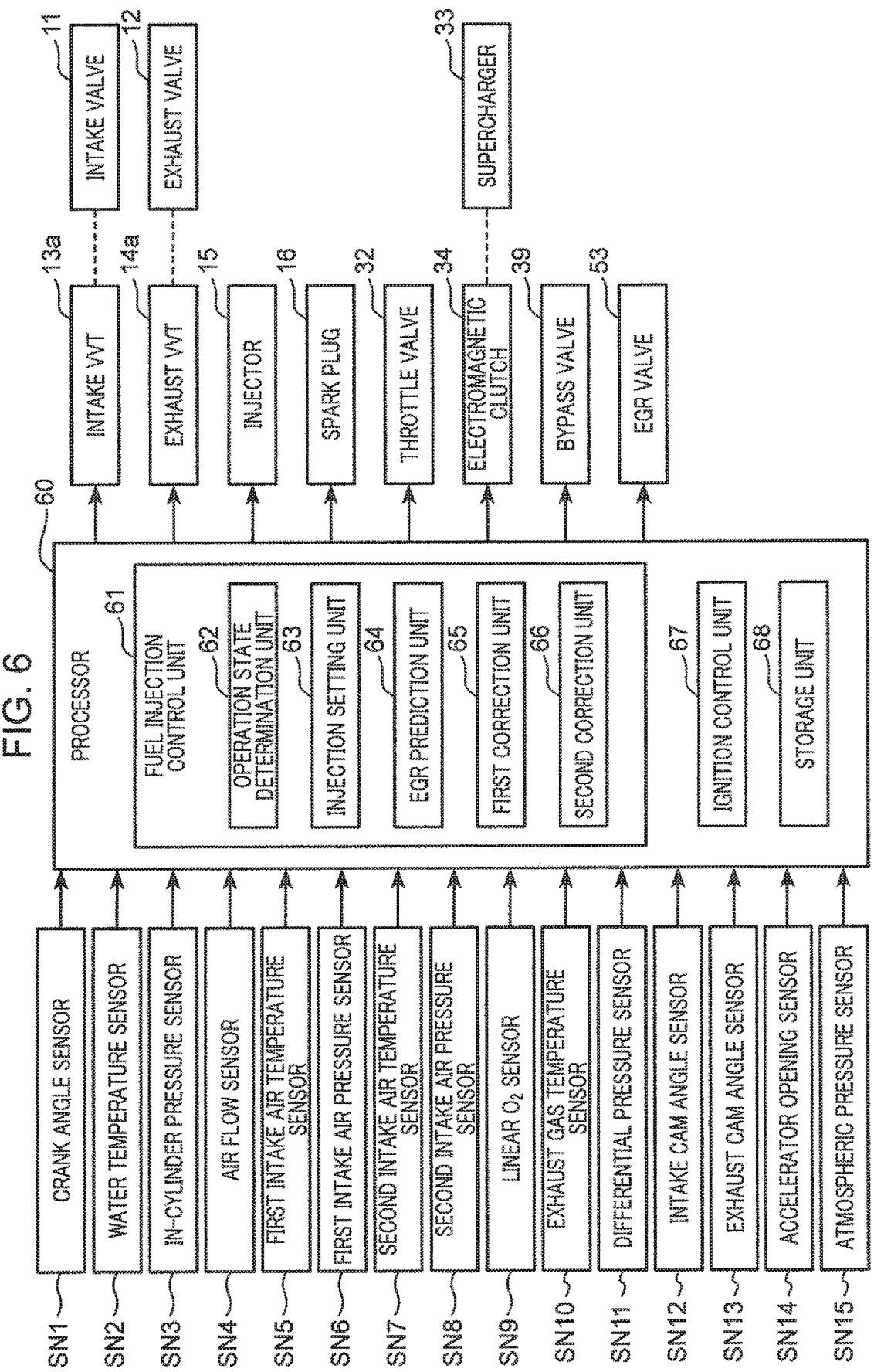

[λ=1]

[Lean]

[CORRECTION AMOUNT OF INJECTION AMOUNT OF EACH CYLINDER IN OPERATION AREA of λ = 1]

[CORRECTION AMOUNT OF INJECTION AMOUNT OF EACH CYLINDER IN OPERATION AREA of λ >1]

COMBUSTION CONTROL DEVICE FOR ENGINE

CROSS-REFERENCE TO RELATED APPLICATION

This application is based on Japanese Patent application No. 2019-072069 filed in Japan Patent Office on Apr. 4, 2019, the contents of which are hereby incorporated by reference.

TECHNICAL FIELD

The present invention relates to a combustion control device for an engine including a plurality of cylinders and being capable of performing an internal EGR operation in each cylinder.

BACKGROUND

In an engine having a plurality of cylinders, it is important to reduce a variation in air-fuel ratio between cylinders from the viewpoint of improving output stability and fuel efficiency. Japanese Patent Publication No. 8-232729 discloses a method of determining the air-fuel ratio of each cylinder based on a detection value of an air-fuel ratio sensor disposed in an exhaust collector part and controlling the air-fuel ratio of each cylinder. However, this method has a disadvantage that it is difficult to determine the air-fuel ratio of each cylinder during a low-load operation in which the flow rate of exhaust gas is low or the like, and thus accurate air-fuel ratio control cannot be executed.

Meanwhile, in order to adjust the in-cylinder temperature of a cylinder to a required temperature, internal EGR that leaves high-temperature burned gas in the cylinder has been widely used. In general, the internal EGR is achieved by setting a valve overlap in which both an intake valve and an exhaust valve are opened. For example, in an engine that performs compression self-ignition combustion, by performing the internal EGR, the temperature of an air-fuel mixture in a cylinder can be increased to a temperature at which self-ignition can be performed. In controlling the air-fuel ratio of cylinders and thus reducing a variation in air-fuel ratio between the cylinders, it is necessary to reflect the re-intake amount of intake air (fresh air) from an intake port into the cylinders in the internal EGR.

Engines are often required to be compact from the viewpoint of mountability on vehicles, and it is sometimes required to set paths in an intake system and an exhaust system as short as possible. For example, the intake system has an independent intake passage connecting a surge tank and an intake port of each cylinder, and in some cases, this independent intake passage must be set short. In this case, during a valve overlap period for the internal EGR, the intake air once blown out of the intake port of one cylinder reaches the surge tank through the independent intake passage due to an intake/exhaust differential pressure, and then is re-intaken not into the one cylinder but into other cylinders. This phenomenon causes a difference in the re-intake amount of intake air between the cylinders, resulting in a variation in air-fuel ratio between the cylinders.

SUMMARY

An object of the present invention is to provide a combustion control device for an engine in which internal EGR is performed, the combustion control device being capable of reducing a variation in air-fuel ratio between a plurality of cylinders.

According to one aspect of the present invention, there is provided a combustion control device for an engine including a plurality of cylinders, a surge tank disposed in an intake path to the cylinders, an independent intake passage connecting the surge tank and an intake port of each of the cylinders, a fuel injection valve that is disposed for each of the cylinders and that supplies fuel into each of the cylinders, and a control unit that controls a fuel injection amount of each of the fuel injection valves according to an engine operating state. The control unit corrects a target fuel injection amount of each of the cylinders, the target fuel injection amount being determined according to the engine operating state, based on a re-intake correction amount set in each of the cylinders according to a re-intake amount of intake air from the intake port in internal EGR in each of the cylinders.

According to another aspect of the present invention, there is provided a combustion control method for an engine, the engine including a plurality of cylinders, a surge tank disposed in an intake path to the cylinders, an independent intake passage connecting the surge tank and an intake port of each of the cylinders, and a fuel injection valve that is disposed for each of the cylinders and that supplies fuel into each of the cylinders, the combustion control method including setting a fuel injection amount of each of the fuel injection valves to a target fuel injection amount of each of the cylinders, the target fuel injection amount being determined according to an engine operating state, and correcting the target fuel injection amount based on a re-intake correction amount set in each of the cylinders according to a re-intake amount from the intake port in internal EGR in each of the cylinders.

BRIEF DESCRIPTION OF DRAWINGS

FIG. 6 is a block diagram illustrating an engine control system;

DETAILED DESCRIPTION

Embodiments of the present invention will be described below with reference to the drawings. In the present embodiment, an example in which a combustion control device for an engine according to the present invention is applied to a compression ignition engine will be described. Of course, the compression ignition engine is an engine that can perform an internal EGR operation in each cylinder.

[Engine System]

Figure 1:
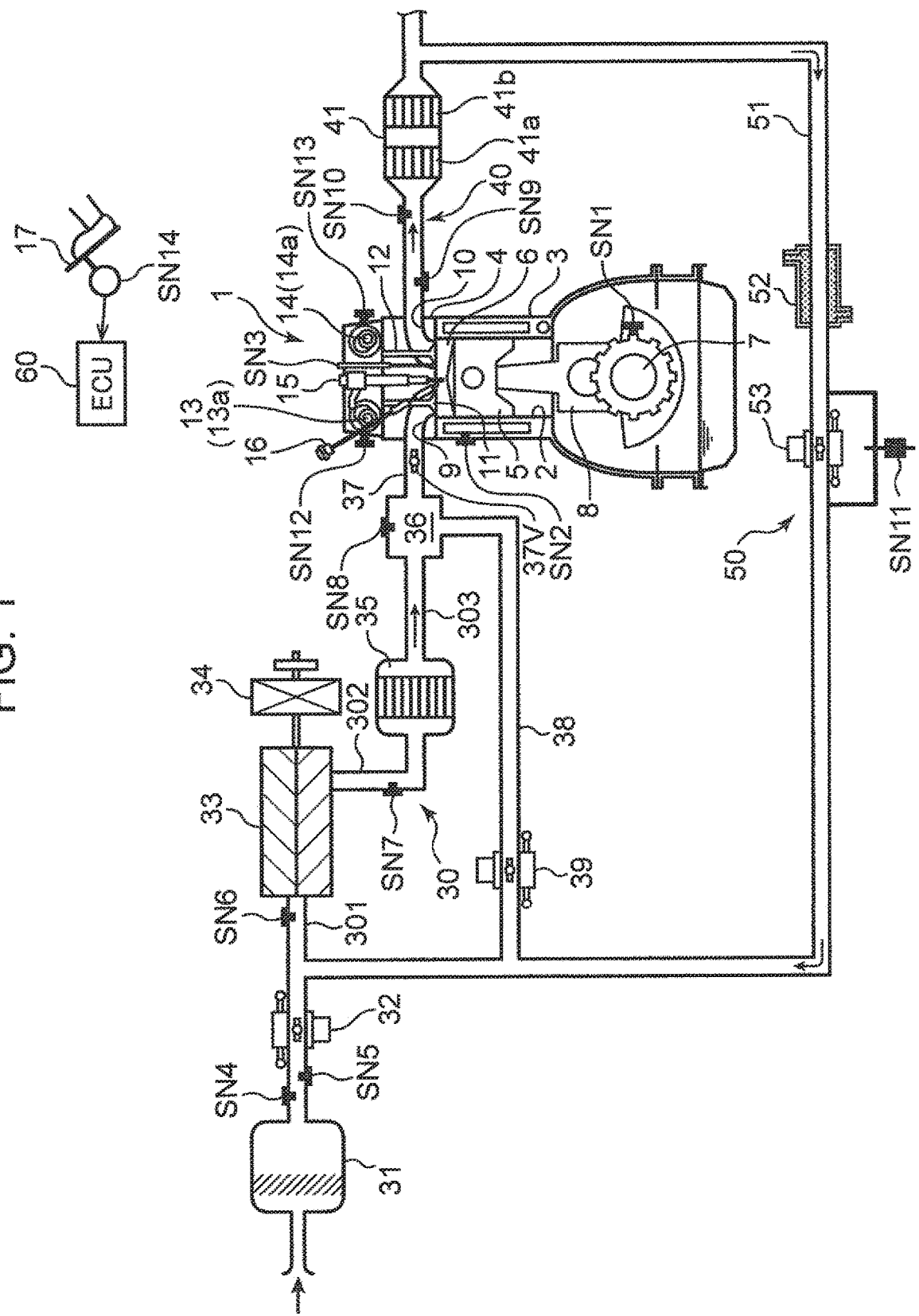
FIG. 1 is a system diagram schematically illustrating an overall configuration of a compression ignition engine to which a combustion control device for an engine according to the present invention is applied.

First, an engine system including the compression ignition engine will be described. FIG. 1 is a diagram illustrating an overall configuration of an engine system according to the present embodiment. The engine system includes an engine body 1 constituted by a four-cycle four-cylinder gasoline direct injection engine, an intake passage 30 through which intake air to be introduced in the engine body 1 flows, an exhaust passage 40 through which exhaust gas discharged from the engine body 1 flows, and an EGR device 50 that recirculates a part of the exhaust gas flowing through the exhaust passage 40 to the intake passage 30.

The engine body 1 includes a cylinder block 3, a cylinder head 4, and a piston 5. The cylinder block 3 has a cylinder liner that forms four cylinders 2 (a plurality of cylinders) arranged in a line. Only one cylinder 2 is illustrated in FIG. 1. The cylinder head 4 is attached to an upper surface of the cylinder block 3 and closes an upper opening of the cylinder 2. The piston 5 is housed in each of the cylinders 2 so as to be capable of reciprocally slidable, and is connected via a connecting rod 8 to a crankshaft 7. In response to a reciprocating movement of the piston 5, the crankshaft 7 rotates about its central axis.

A combustion chamber 6 is formed above the piston 5. Fuel mainly composed of gasoline is supplied to the combustion chamber 6 by injection from an injector 15 to be described later. The mixture of the supplied fuel and air is burned in the combustion chamber 6, and the piston 5 pushed down by expansion force due to the combustion reciprocates in a vertical direction. The geometric compression ratio of the cylinder 2, that is, the ratio of the volume of the combustion chamber 6 when the piston 5 is at a top dead center to the volume of the combustion chamber 6 when the piston 5 is at a bottom dead center is set to a high compression ratio of 13 or more and 30 or less, preferably 14 or more and 18 or less so as to be appropriate for SPCCI combustion to be described later.

The cylinder block 3 includes a crank angle sensor SN1 and a water temperature sensor SN2. The crank angle sensor SN1 is disposed to detect a rotation angle (crank angle) of the crankshaft 7 and a rotation speed of the crankshaft 7, that is, an engine speed. The water temperature sensor SN2 detects a temperature of cooling water flowing in the cylinder block 3 and the cylinder head 4, that is, an engine water temperature.

The cylinder head 4 has an intake port 9 and an exhaust port 10 that communicate with the combustion chamber 6. The bottom surface of the cylinder head 4 is a ceiling surface of the combustion chamber 6. On the ceiling surface of the combustion chamber, an intake-side opening that is a downstream end of the intake port 9 and an exhaust-side opening that is an upstream end of the exhaust port 10 are formed. An intake valve 11 that opens and closes the intake port 9 and an exhaust valve 12 that opens and closes the exhaust port 10 are attached to the cylinder head 4. Although not illustrated, the valve type of the engine body 1 is a four-valve type of two intake valves×two exhaust valves, and two intake ports 9 and two exhaust ports 10 are provided for each cylinder 2. In addition, two intake valves 11 and two exhaust valves 12 are also provided for each cylinder 2.

The cylinder head 4 includes an intake-side valve train 13 and an exhaust-side valve train 14 that include a camshaft. The intake valve 11 and the exhaust valve 12 are driven to be opened and closed by these valve trains 13 and 14 in conjunction with the rotation of the crankshaft 7. The intake-side valve train 13 incorporates an intake VVT 13a that can change at least an open time of the intake valve 11. Similarly, the exhaust-side valve train 14 includes an exhaust VVT 14a that can change at least a close time of the exhaust valve 12. By controlling the intake VVT 13a and the exhaust VVT 14a, it is possible to set a valve overlap in which both the intake valve 11 and the exhaust valve 12 are opened across an exhaust top dead center (internal EGR mechanism). By setting the valve overlap, internal EGR that leaves high-temperature burned gas in the combustion chamber 6 is achieved. By adjusting a valve overlap amount that is a period during which the valve overlap is performed, an internal EGR amount (remaining amount of burned gas) can be adjusted.

In addition, the cylinder head 4 includes the injector 15 (fuel injection valve) and a spark plug 16 for each of the four cylinders 2. The injector 15 injects (supplies) fuel into the cylinder 2. As the injector 15, a multi-injection-hole type injector that has a plurality of injection holes at its distal end and is capable of injecting fuel radially from these injection holes can be used. The injector 15 is disposed so that its distal end is exposed to the combustion chamber 6 and faces a radial center of a crown surface of the piston 5.

The spark plug 16 is disposed at a position slightly shifted to an intake side with respect to the injector 15, and is also disposed at a position where its distal end electrode portion faces the inside of the cylinder 2. The spark plug 16 is a forced ignition source that ignites a mixture of fuel and air formed in the cylinder 2 (combustion chamber 6).

The cylinder head 4 includes, as sensing elements, an in-cylinder pressure sensor SN3, an intake cam angle sensor SN12, and an exhaust cam angle sensor SN13. The in-cylinder pressure sensor SN3 detects a pressure of the combustion chamber 6. The intake cam angle sensor SN12 detects a rotational position of the camshaft of the intake-side valve train 13. The exhaust cam angle sensor SN13 detects a rotational position of the camshaft of the exhaust-side valve train 14.

The intake passage 30 is connected to one side surface of the cylinder head 4 so as to cause outside air to communicate with the intake port 9. Air (fresh air) taken from an upstream end of the intake passage 30 is introduced in the combustion chamber 6 through the intake passage 30 and the intake port 9. The intake passage 30 includes an air cleaner 31, a throttle valve 32, a supercharger 33, an electromagnetic clutch 34, an intercooler 35, a surge tank 36, and an independent intake passage 37 in this order from an upstream side.

The air cleaner 31 cleans intake air by removing foreign substances in the intake air. The throttle valve 32 opens and closes the intake passage 30 in conjunction with a depression operation of an accelerator 17, and thus adjusts the flow rate of intake air in the intake passage 30. The supercharger 33 sends out intake air to a downstream side of the intake passage 30 while compressing the intake air. The supercharger 33 is a supercharger mechanically linked to the engine body 1, and engagement with the engine body 1 and disengagement from the engine body 1 are switched by the electromagnetic clutch 34. When the electromagnetic clutch 34 is engaged, drive force is transmitted from the engine body 1 to the supercharger 33, and the supercharger 33 performs supercharging. The intercooler 35 cools intake air compressed by the supercharger 33.

The surge tank 36 is a tank that is disposed in an intake path to the four cylinders 2 and provides a space for equally distributing intake air to the four cylinders 2. The independent intake passage 37 is a passage that is disposed on the downstream side of the surge tank 36 and independently connects the surge tank 36 to each of the intake ports 9 of the four cylinders 2. Intake air supplied from a side of the air cleaner 31 flows into the air cleaner 31 and then is supplied to the intake port 9 of each cylinder 2 through each independent intake passage 37. A swirl valve 37A is disposed in one of the two intake ports 9 corresponding to each cylinder 2. By adjusting an opening of the swirl valve 37A, the intensity of a swirl flow swirling around the central axis of the combustion chamber 6 can be adjusted. Note that the intake port 9 of the present embodiment is a tumble port capable of forming a tumble flow. For this reason, the swirl flow formed when the swirl valve 37A is closed is an oblique swirl flow mixed with the tumble flow.

The intake passage 30 includes, at the respective portions, an air flow sensor SN4 that detects the flow rate of intake air, a first intake air temperature sensor SN5 and a second intake air temperature sensor SN7 that detect the temperature of intake air, and a first intake air pressure sensor SN6 and a second intake air pressure sensor SN8 that detect the pressure of intake air. The air flow sensor SN4 and the first intake air temperature sensor SN5 are disposed in a portion between the air cleaner 31 and the throttle valve 32 in the intake passage 30, and detect the flow rate and temperature of intake air passing through the portion. The first intake air pressure sensor SN6 is disposed in a portion between the throttle valve 32 and the supercharger 33 in the intake passage 30 (downstream side of connection port of EGR passage 51 to be described later), and detects the pressure of intake air passing through the portion. The second intake air temperature sensor SN7 is disposed in a portion between the supercharger 33 and the intercooler 35 in the intake passage 30, and detects the temperature of intake air passing through the portion. The second intake air pressure sensor SN8 is disposed in the surge tank 36 and detects the pressure of intake air in the surge tank 36.

The intake passage 30 includes a bypass passage 38 for allowing intake air to bypass the supercharger 33 and to be sent to the combustion chamber 6. The bypass passage 38 connects the surge tank 36 to a vicinity of a downstream end of the EGR passage 51 to be described later. The bypass passage 38 includes a bypass valve 39 that can open and close the bypass passage 38.

The exhaust passage 40 is connected to the other side surface of the cylinder head 4 so as to communicate with the exhaust port 10. Burned gas (exhaust gas) generated in the combustion chamber 6 is discharged to the outside through the exhaust port 10 and the exhaust passage 40. The exhaust passage 40 includes a catalytic converter 41. The catalytic converter 41 incorporates a three-way catalyst 41a for purifying harmful components (HC, CO, and NOx) contained in exhaust gas flowing through the exhaust passage 40 and a GPF (gasoline particulate filter) 41b for collecting a particulate matter (PM) contained in the exhaust gas. Note that another catalytic converter that incorporates an appropriate catalyst such as a three-way catalyst or a NOx catalyst may be added on a downstream side of the catalytic converter 41.

A linear $O_2$ sensor SN9 that detects the concentration of oxygen contained in exhaust gas and an exhaust gas temperature sensor SN10 that measures the temperature of exhaust gas are disposed in a portion of the exhaust passage 40 on an upstream side of the catalytic converter 41. The linear $O_2$ sensor SN9 is a sensor whose output value changes linearly according to the density of the oxygen concentration. The air-fuel ratio of an air-fuel mixture can be estimated based on the output value of the linear $O_2$ sensor SN9. A measured value of the exhaust gas temperature sensor SN10 is used for calculating a predicted value of the internal EGR amount.

The EGR device 50 includes the EGR passage 51 that connects the exhaust passage 40 to the intake passage 30, and an EGR cooler 52 and an EGR valve 53 disposed in the EGR passage 51. The EGR passage 51 connects a portion of the exhaust passage 40 on the downstream side of the catalytic converter 41 to the portion between the throttle valve 32 and the supercharger 33 in the intake passage 30. The EGR cooler 52 cools exhaust gas (external EGR) recirculating from the exhaust passage 40 to the intake passage 30 through the EGR passage 51 by heat exchange. The EGR valve 53 is disposed in the EGR passage 51 on a downstream side of the EGR cooler 52 so as to be openable and closable, and adjusts the flow rate of exhaust gas flowing through the EGR passage 51. The EGR passage 51 includes a differential pressure sensor SN11 for detecting a difference between the pressure on the upstream side of the EGR valve 53 and the pressure on the downstream side of the EGR valve 53.

The accelerator 17 includes an accelerator opening sensor SN14 for detecting an accelerator opening. The accelerator opening sensor SN14 is a sensor that detects the degree of depression of a pedal for the accelerator 17, and is also a sensor that detects the driver's intention to accelerate or decelerate.

[Structural Feature of Intake Passage and Exhaust Passage]

Figure 2:
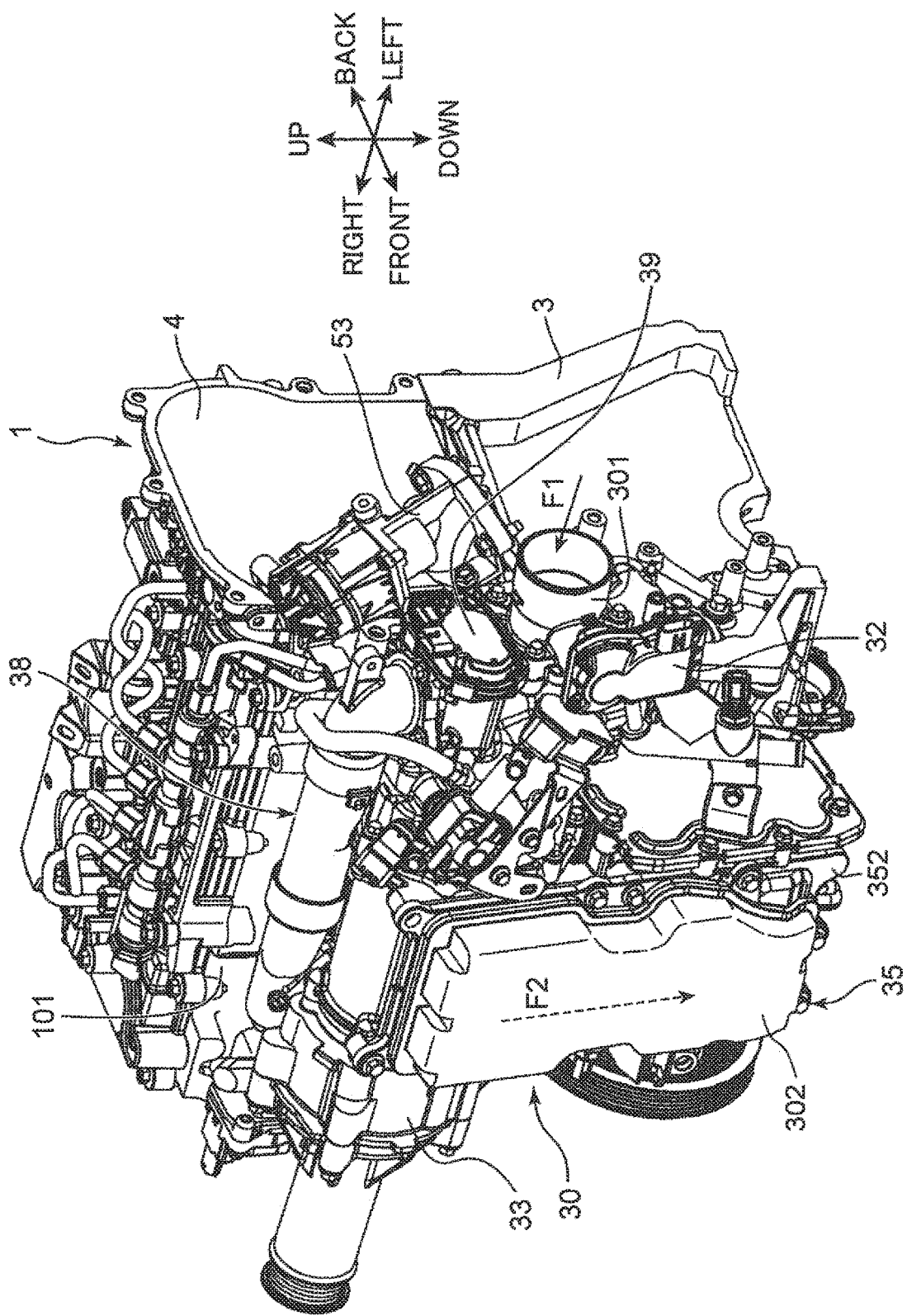
FIG. 2 is a perspective view illustrating an appearance of an engine body.
Figure 3:
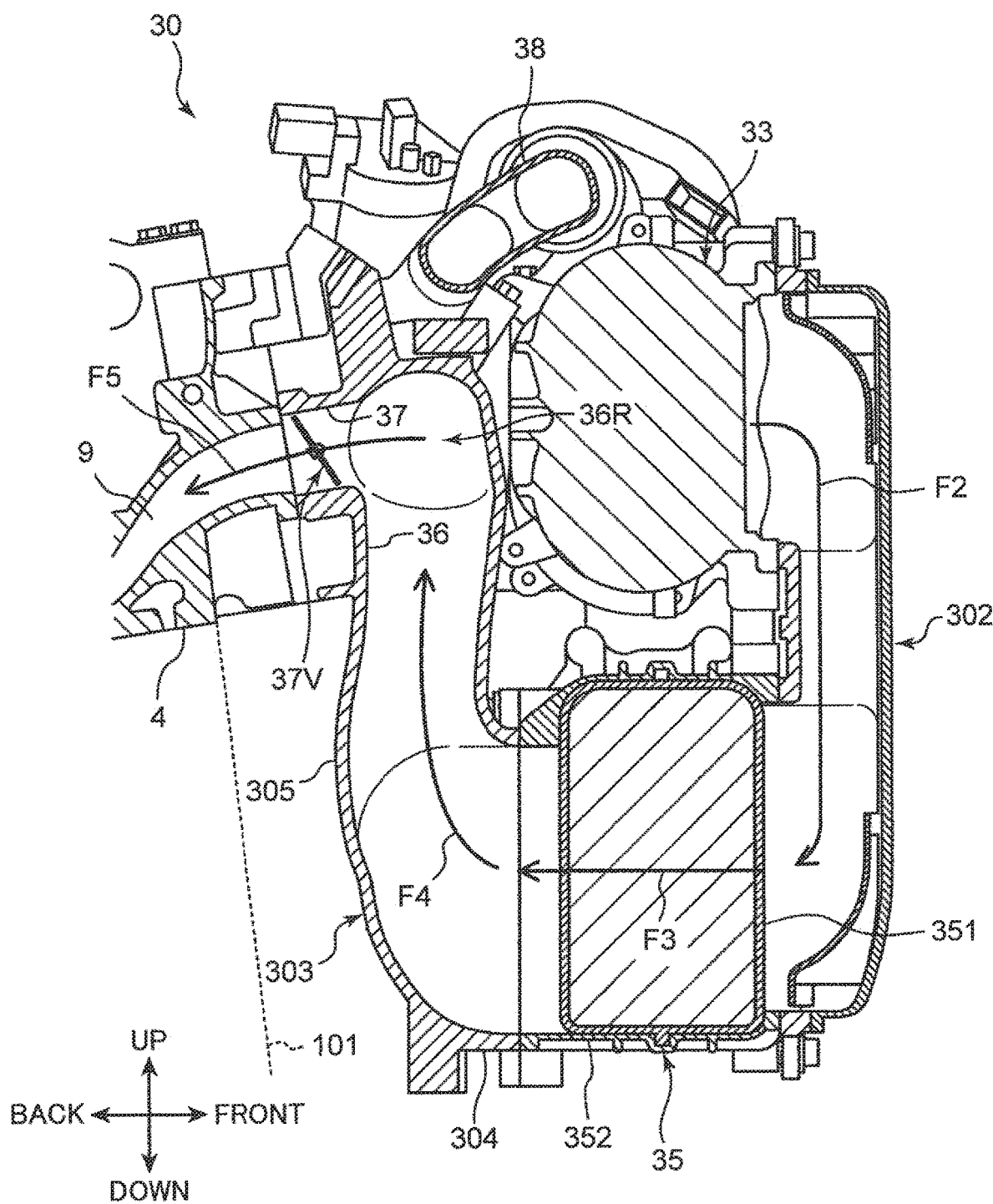
FIG. 3 is a vertical sectional view of the engine body, the vertical cross-sectional view illustrating a structure of an intake passage.
Figure 4:
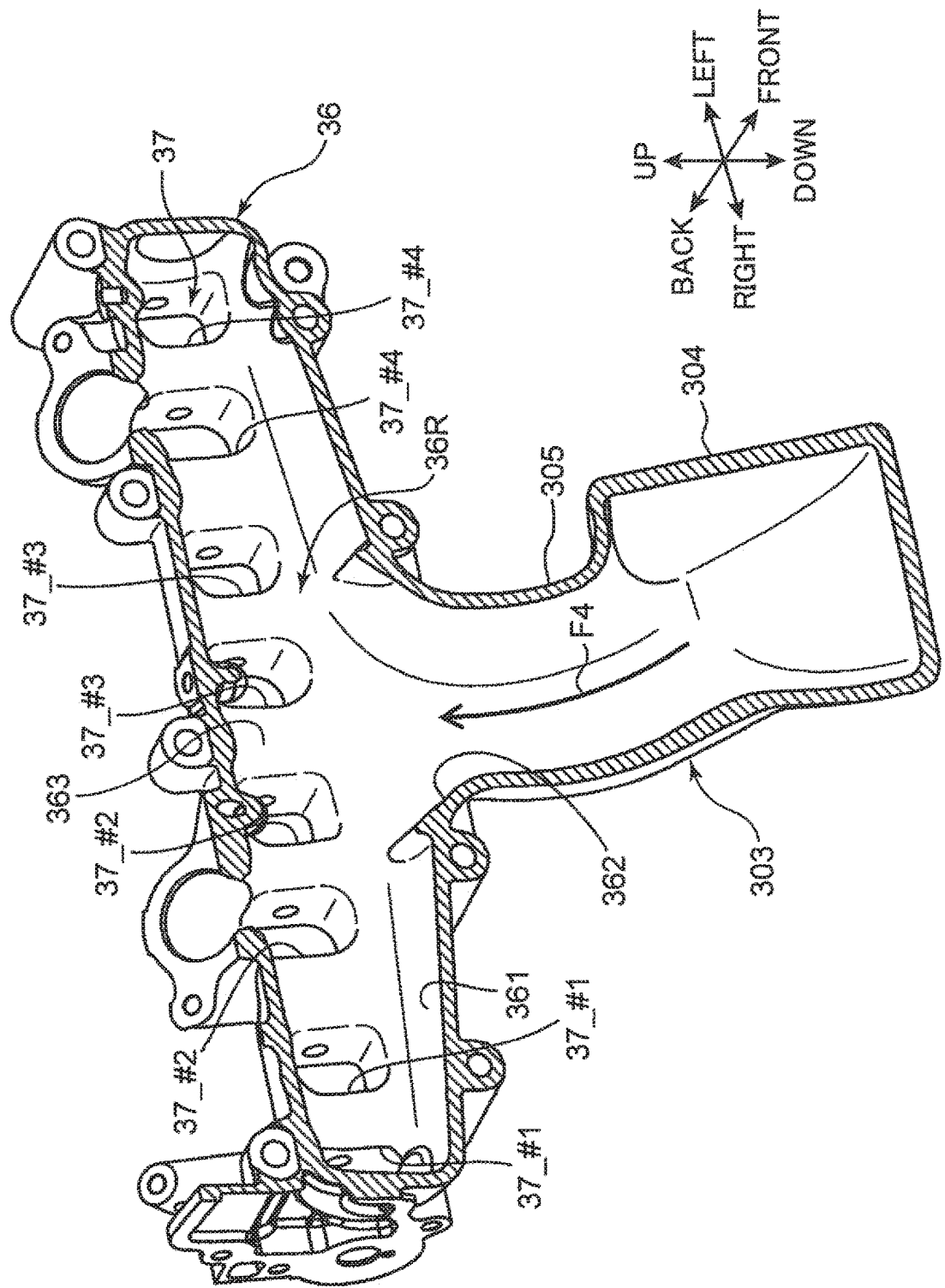
FIG. 4 is a vertical sectional view of a vicinity of a surge tank disposed in the intake passage.

Next, structural feature of the intake passage 30 and exhaust passage 40 described above will be described. FIG. 2 is a perspective view illustrating an appearance of the engine body 1, FIG. 3 is a vertical sectional view of the engine body 1 in a front-back direction, the vertical sectional view illustrating a structure of the intake passage 30, and FIG. 4 is a vertical sectional view of the engine body 1 in a left-right direction, the vertical sectional view illustrating a vicinity of the surge tank 36 disposed in the intake passage 30. While these figures include direction indications such as up, down, front, back, left, and right, these are used for convenience of description, and not intended to limit actual directions.

The intake passage 30 is attached to a side of a front surface 101 of the engine body 1. Although not illustrated in FIG. 2 and FIG. 3, the exhaust passage 40 is attached to a side of a back surface of the engine body 1. As also illustrated in FIG. 1, the intake passage 30 includes a first passage 301, a second passage 302, and a third passage 303. The first passage 301 is an intake passage connecting between the air cleaner 31 and the supercharger 33. The downstream end of the EGR passage 51 joins the first passage 301 on the downstream side of the throttle valve 32. The second passage 302 is an intake passage connecting between the supercharger 33 and the intercooler 35. The third passage 303 is an intake passage connecting between the intercooler 35 and the surge tank 36.

The supercharger 33 is attached to the front surface 101 near an upper right side of the engine body 1. The first passage 301 extends so as to project right from the supercharger 33, and guides air purified by the air cleaner 31 to the supercharger 33. The intercooler 35 is attached to the front surface 101 near a lower part of the engine body 1. The second passage 302 extends in the vertical direction at the center part of the engine body 1 in the left-right direction, and guides air (and external EGR) having passed through the supercharger 33 to the intercooler 35. The intercooler 35 includes a water-cooled core 351 and a cooler housing 352 that supports the core 351. The downstream end of the second passage 302 is connected to an upstream end of the third passage 303 by the cooler housing 352.

As illustrated in FIG. 3, the surge tank 36 is disposed near the upper part of the engine body 1 so as to face an upstream end of the intake port 9 and be adjacent to a back surface of the supercharger 33. The third passage 303 extends in the vertical direction at the center part of the engine body 1 in the left-right direction, and guides air having passed through the intercooler 35 and having been cooled to the surge tank 36. The bypass passage 38 extends in the left-right direction near the upper part of the engine body 1.

The independent intake passage 37 extends in the front-back direction so as to connect the surge tank 36 to the upstream end of the intake port 9. FIG. 3 illustrates the independent intake passage 37 in which a swirl valve 37V is disposed. The independent intake passage 37 of the present embodiment is a passage having a short flow path length, and is set to a flow path length shorter than a front-back direction width of an internal space 36R in the surge tank 36. Specifically, the flow path length of the independent intake passage 37 is set to about ½ of the front-back direction width of the internal space 36R and to be slightly longer than a valve body length of the swirl valve 37V. That is, when the swirl valve 37V is fully opened, one end of the valve body enters the intake port 9 and the other end enters the surge tank 36. As the independent intake passage 37 is short as described above, the engine system can be made compact and the mountability on a vehicle is improved. However, the flow path length of the independent intake passage 37 is also a length that allows intake air blown out of the intake port 9 to reach the surge tank 36 during a valve overlap period for performing internal EGR. Problems due to this will be described later with reference to FIG. 10.

The flow of intake air in the intake passage 30 is illustrated in FIG. 2 and FIG. 3 by arrows F1 to F5. As indicated by the arrow F1, intake air is taken in the first passage 301 through the air cleaner 31. Next, the intake air is blown out to the second passage 302 through a scroll part of a compressor in the supercharger 33. Subsequently, the intake air flows from up to down in the second passage 302 (arrow F2), enters the cooler housing 352 of the intercooler 35, and passes through the core 351 (arrow F3). Thereafter, the intake air flows from down to up in the third passage 303 (arrow F4), and reaches the internal space 36R of the surge tank 36. The intake air then changes its flow direction to the front-back direction, passes through each independent intake passage 37, and flows into the intake port 9 (arrow F5).

The arrangement relationship between the surge tank 36 and each independent intake passage 37 will be described with reference to FIG. 4. The housing forming the surge tank 36 is formed integrally with a housing forming the third passage 303 (upstream intake path). The housing of the third passage 303 includes a collecting part 304 that collects intake air having passed through the intercooler 35 and an introduction part 305 that is coupled to a downstream of the collecting part 304 to be connected to the surge tank 36.

The surge tank 36 has the internal space 36R (flow path space) that is long in the left-right direction. The longitudinal direction of the internal space 36R is an arrangement direction (left-right direction) in which the four cylinders 2 are arranged in a line. The downstream end of the introduction part 305 (third passage 303) communicates with the internal space 36R through an introduction port 362 that is open in a bottom wall 361 of the surge tank 36. The introduction port 362 is disposed in a central area of the bottom wall 361 in the longitudinal direction. That is, the third passage 303 has a structure (hereinafter, referred to as "center intake structure") in which intake air is introduced in a central area of the surge tank 36 in the longitudinal direction, as indicated by the arrow F4.

The independent intake passage 37 extends rearward from an opening formed in a back wall 363 of the surge tank 36, the back wall 363 being a wall orthogonal to the bottom wall 361. The back wall 363 is a wall that is long in the left-right direction. As described above, since each cylinder 2 is a four-valve type, each cylinder 2 includes two independent intake passages 37. In FIG. 4, the four cylinders 2 are represented as #1 to #4 cylinders 2, two independent intake passages corresponding to the #1 cylinder 2 are represented as "37_#1", and two independent intake passages corresponding to the #2 cylinder 2 are represented "37_#2". Eight independent intake passages 37_#1 to 37_#4 in total are arranged in a line in the left-right direction, which is the arrangement direction of the four cylinders 2. The independent intake passages 37_#1 for the #1 cylinder 2 and the independent intake passages 37_#4 for the #4 cylinder 2 are relatively far from the introduction port 362, whereas the independent intake passages 37_#2 for the #2 cylinder 2 and the independent intake passages 37_#3 for the #3 cylinder 2 are relatively near the introduction port 362.

Figure 5:
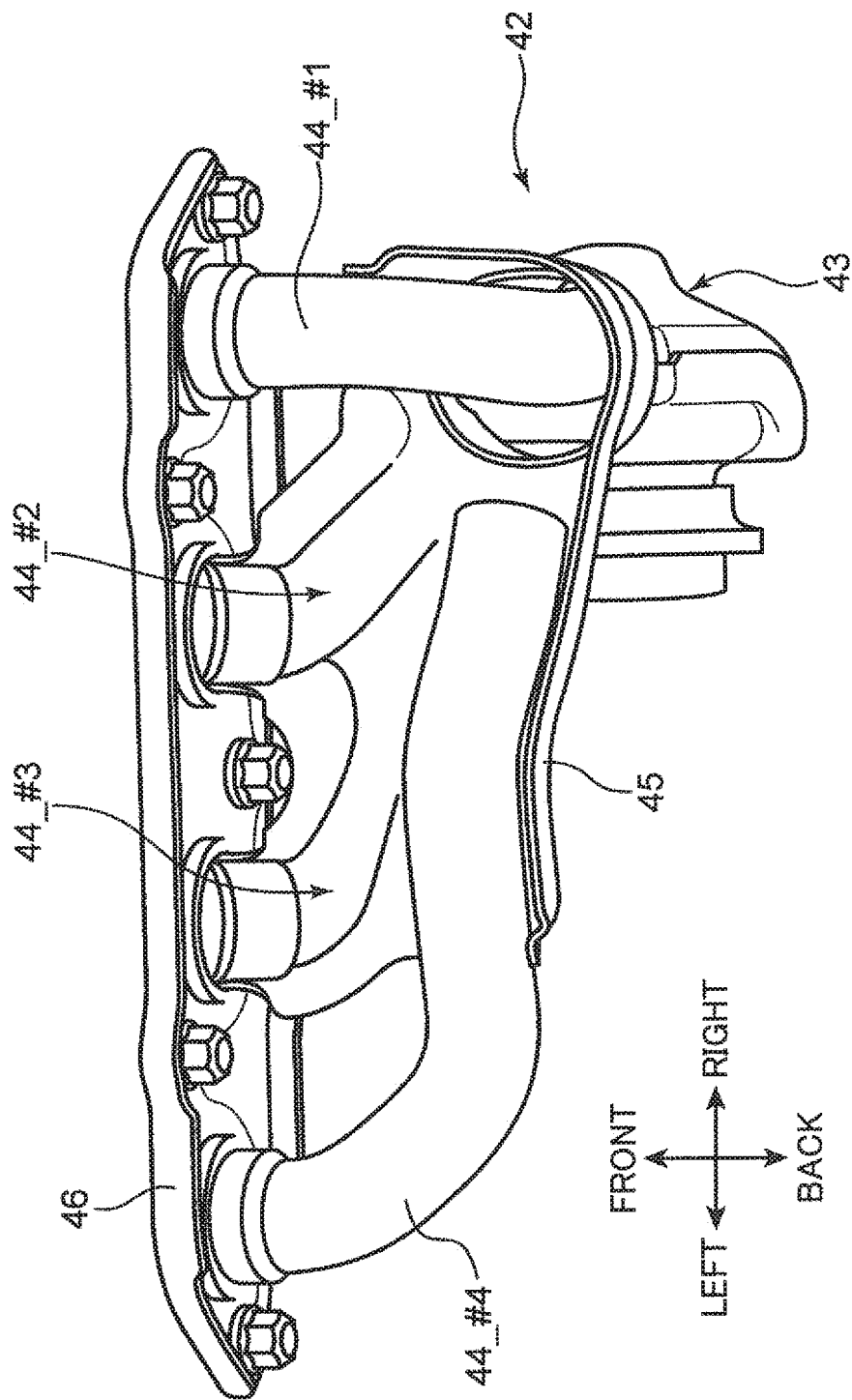
FIG. 5 is a partially cutaway perspective view of an exhaust manifold.

Next, the structural characteristics of the exhaust passage 40 will be described. As illustrated in FIG. 5, the exhaust passage 40 includes an exhaust manifold 42 (exhaust collector part) connected to the exhaust port 10 of the engine body 1. The exhaust manifold 42 collects exhaust gas discharged from each of the exhaust ports 10 of the #1 to #4 cylinders 2. The exhaust gas collected in the exhaust manifold 42 is guided downstream by an exhaust pipe 43 (downstream exhaust path) connected to the catalytic converter 41.

The exhaust manifold 42 includes independent exhaust pipes 44_#1 to 44_#4 (exhaust paths) respectively corresponding to the #1 to #4 cylinders 2, a joining part 45 that joins exhaust air guided by the independent exhaust pipes 44_#1 to 44_#4, and a fastening flange 46 functioning as a part to be attached to the back surface of the engine body 1. As can be seen from FIG. 5, the independent exhaust pipe 44_#1 corresponding to the #1 cylinder 2 (one-end-side cylinder) located at the right end (one end) among the #1 to #4 cylinders 2 has the shortest path connected from the exhaust port 10 to the exhaust pipe 43 on the downstream side. Regarding the independent exhaust pipes 44_#2, 44_#3, and 44_#4 respectively corresponding to the #2 to #4 cylinders 2, a cylinder 2 (#2, #3, and #4) closer to the left side (other end side) has a longer path extending from the corresponding exhaust port 10 to the exhaust pipe 43. In other words, the independent exhaust pipe 44_#1 is directed straight to the exhaust pipe 43 with the shortest flow path length. Meanwhile, a cylinder 2 (#2, #3, and #4) closer to the left side has a longer flow path length of the independent exhaust pipes 44_#2, 44_#3, and 44_#4 to the exhaust pipe 43 (hereinafter, referred to as "end uneven exhaust structure").

[Control Configuration]

FIG. 6 is a block diagram illustrating a control configuration of the engine system. The engine system of the present embodiment is generally controlled by a processor 60 (combustion control device for engine). The processor 60 is a microprocessor configured by a CPU, a ROM, a RAM, and the like.

Detection signals from various sensors are input to the processor 60. The processor 60 are electrically connected to the crank angle sensor SN1, the water temperature sensor SN2, the in-cylinder pressure sensor SN3, the air flow sensor SN4, the first and second intake air temperature sensors SN5 and SN7, the first and second intake air pressure sensors SN6 and SN8, the linear $O_2$ sensor SN9, the exhaust gas temperature sensor SN10, the differential pressure sensor SN11, the intake cam angle sensor SN12, the exhaust cam angle sensor SN13, and the accelerator opening sensor SN14 that are described above, and an atmospheric pressure sensor SN15. The atmospheric pressure sensor SN15 is a sensor that measures an atmospheric pressure of traveling environment, and is exclusively used to detect a traveling altitude. Information detected by these sensors SN1 to SN15, namely, information such as a crank angle, an engine rotation speed, an engine water temperature, an in-cylinder pressure, an intake air flow rate, an intake air temperature, an intake air pressure, an oxygen concentration of exhaust gas, an exhaust gas temperature, a differential pressure before and after the EGR valve 53, an intake/exhaust cam angle, an accelerator opening, and an atmospheric pressure are sequentially input to the processor 60.

The processor 60 controls various parts of the engine while making various determinations and performing computations based on input information from the sensors described above. That is, the processor 60 is electrically connected to the intake VVT 13a, the exhaust VVT 14a, the injector 15, the spark plug 16, the throttle valve 32, the electromagnetic clutch 34, the bypass valve 39, the EGR valve 53, and the like, and outputs a control signal to each of these devices based on the results of the computations.

An ECU 100 operates so as to functionally include a fuel injection control unit 61 (control unit), an ignition control unit 67, and a storage unit 68 by execution of a predetermined program. The fuel injection control unit 61 controls the amount of fuel injected by each of the injectors 15 of the #1 to #4 cylinders 2 according to an engine operating state. The ignition control unit 67 controls an ignition operation of the spark plug 16. The storage unit 68 stores various data, set values, arithmetic expressions, and the like. In the present embodiment, the storage unit 68 stores a specific re-intake correction amount in internal EGR to be described later, a polynomial model for estimating an internal EGR amount, and the like.

The fuel injection control unit 61 operates so as to functionally include an operation state determination unit 62, an injection setting unit 63, an EGR prediction unit 64, a first correction unit 65, and a second correction unit 66 by the execution of a predetermined program.

The operation state determination unit 62 determines an operating state of the engine body 1 from an engine speed based on a detection value of the crank angle sensor SN1, an engine load based on opening information of the accelerator opening sensor SN14, and the like. The determination result is used to determine which area of a predetermined operation map the current operation area corresponds to.

The injection setting unit 63 sets the amount of fuel injected from the injector 15 and an injection pattern according to various conditions. The injection setting unit 63 first sets a target fuel injection amount and the injection pattern according to an accelerator depression amount (engine operating state) detected by the accelerator opening sensor SN14. Further, the injection setting unit 63 corrects at least the target fuel injection amount according to a state where the internal EGR is performed, that is, by referring to a primary correction amount derived by the first correction unit 65 to be described later and a secondary correction amount derived by the second correction unit 66 to be described later.

The EGR prediction unit 64 performs a process of calculating a predicted value of a return amount of burned gas from the side of the exhaust passage 40 to the cylinder 2 (internal EGR amount) in the internal EGR performed by setting the valve overlap period of the intake valve 11 and the exhaust valve 12. Note that the return amount of burned gas is also the blow-out amount of intake air pushed out from the cylinder 2 toward a side of the intake passage 30 by the return of the burned gas, and is also the re-intake amount of blown-out intake air from the intake port 9. The EGR prediction unit 64 uses the polynomial model stored in the storage unit 68 to calculate the internal EGR amount.

The first correction unit 65 primarily corrects the target fuel injection amount set by the injection setting unit 63 according to the operating state. The primary correction amount in the first correction unit 65 is a specific correction amount determined by the engine structure, particularly the structure of the intake passage 30 and the exhaust passage 40. In the present embodiment, the intake passage 30 has the center intake structure (FIG. 4), and the exhaust passage 40 has the end uneven exhaust structure (FIG. 5). Because of these structures, the re-intake amount of intake air from the intake port 9 in the #1 to #4 cylinders 2 or the return amount of burned gas from the exhaust port 10 in the internal EGR may differ depending on the operation conditions. For example, in an operation area with relatively small valve overlap amount and relatively small internal EGR amount, the center intake structure affects the re-intake amount of intake air in each cylinder 2, and causes a variation in air-fuel ratio among the #1 to #4 cylinders 2. On the other hand, in an operation area with relatively large valve overlap amount and relatively large internal EGR amount, the end uneven exhaust structure affects the return amount of burned gas in each cylinder 2, and causes a variation in air-fuel ratio among the #1 to #4 cylinders 2 (described later with reference to FIG. 10).

In the operation area with relatively small internal EGR amount (operation area of SPCCI_$\lambda$=1 to be described later), the first correction unit 65 primarily corrects the target fuel injection amount by using the re-intake correction amount set in each of the #1 to #4 cylinders 2 according to the re-intake amount from the intake port 9 of each of the #1 to #4 cylinders 2 as the primary correction amount. On the other hand, in the operation area with relatively large internal EGR amount (operation area of SPCCI_$\lambda$>1 to be described later), the first correction unit 65 primarily corrects the target fuel injection amount by using the return correction amount set in each of the #1 to #4 cylinders 2 according to the return amount of burned gas from the exhaust port 10 of each of the #1 to #4 cylinders 2 as the primary correction amount. The re-intake correction amount and the return correction amount are stored in the storage unit 68 for each of the #1 to #4 cylinders 2 by associating the internal EGR amount with the correction amount, and the first correction unit 65 performs the primary correction process described above by reading the re-intake correction amount or the return correction amount.

The second correction unit 66 secondarily corrects at least the specific re-intake correction amount set by the first correction unit 65 according to variables based on the operating state and environmental conditions. Examples of the variables include an intake air pressure, a valve overlap amount, a close time of the exhaust valve 12, an engine speed, an atmospheric pressure, and an exhaust gas temperature. When the above variables change, the re-intake amount of intake air from each intake port 9 may also change. Consequently, if only the specific re-intake correction amount derived from the engine structure is used, the air-fuel ratios of the #1 to #4 cylinders 2 may not match accurately. In view of this point, the second correction unit 66 performs a secondary correction to increase or reduce the specific re-intake correction amount set by the first correction unit 65 according to the state of the variables. The secondary correction amount in the second correction unit 66 is determined in advance by the degree of deviation of the variables from reference values.

[Operation Map]

Figure 7A:
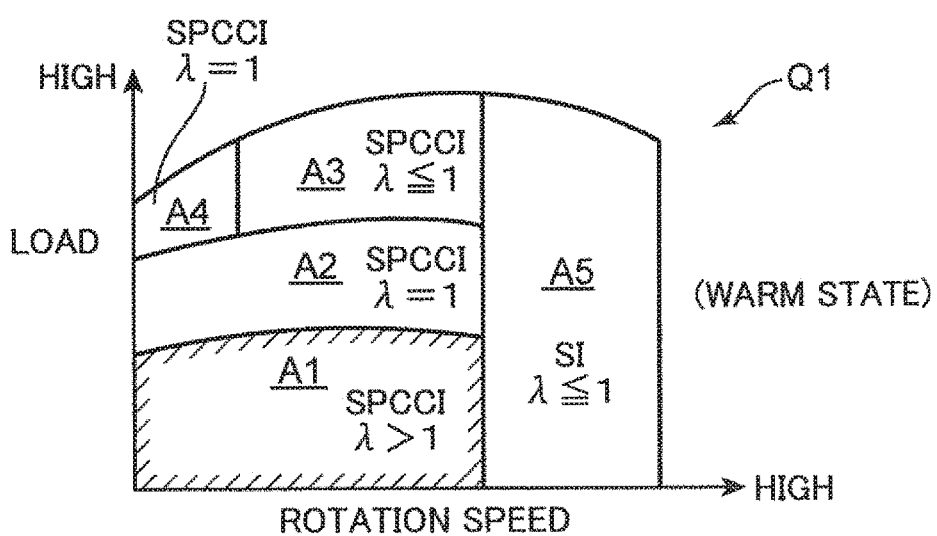
FIGS. 7A to 7C are engine operating maps in a warm state, a half warmed-up state, and a cold state, respectively.
Figure 7B:
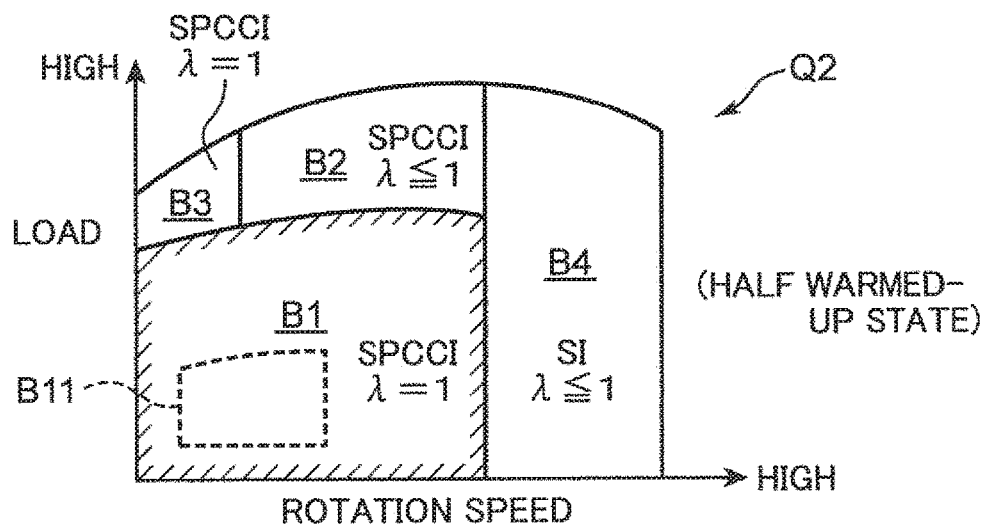
Figure 7C:
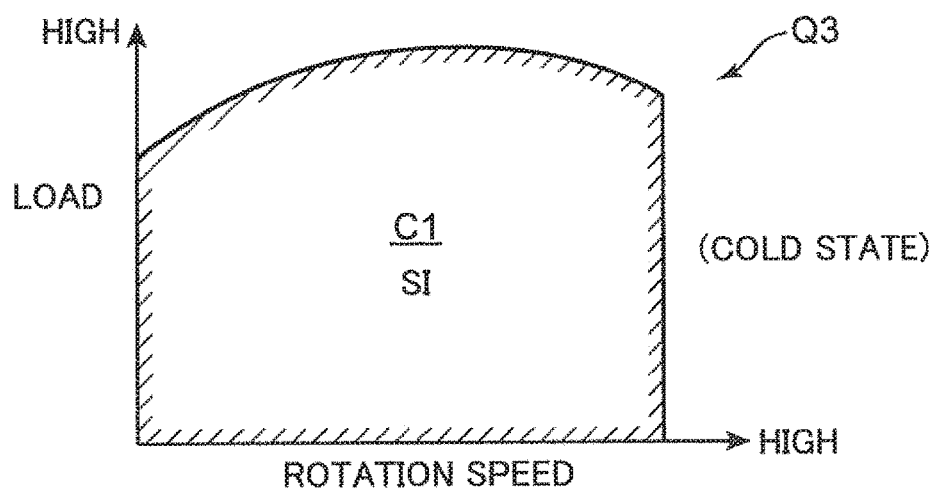

FIGS. 7A to 7C are operation maps for explaining differences in control according to the degree of progress of warm-up of an engine and the speed/load of the engine. In the present embodiment, a first operation map Q1 (FIG. 7A) used in a warm state where the engine has been warmed up, a second operation map Q2 (FIG. 7B) used in a half warmed-up state where the engine is warmed up halfway, and a third operation map Q3 (FIG. 7C) used in a cold state where the engine not warmed up are prepared. The first operation map Q1 in the warm state includes first, second, third, fourth, and fifth operation areas A1, A2, A3, A4, and A5 having different combustion modes. The second operation map Q2 in the half warmed-up state includes sixth, seventh, eighth, and ninth operation areas B1, B2, B3, and B4 having different combustion modes. The third operation map Q3 in the cold state includes only a tenth operation area C1.

<Warm State>

In the first operation map Q1, the first area A1 is an area of low and medium speed/low load obtained by removing a part of an area on a high speed side from a low load area with low engine load (including no-load). The second area A2 is an area of low and medium speed/medium load where the load is higher than that in the first area A1. The fourth area A4 is a low speed/high load area where the load is higher and the rotation speed is lower than those in the second area A2. The third area A3 is a medium speed/high load area where the rotation speed is higher than that in the fourth area A4. The fifth area A5 is a high speed area where the rotation speed is higher than that in any of the first to fourth areas A1 to A4.

In the first area A1, partial compression ignition combustion (hereinafter, referred to as "SPCCI combustion") in which SI combustion and CI combustion are combined is performed. The SI combustion is a combustion mode in which an air-fuel mixture is ignited by a spark generated from the spark plug 16, and the air-fuel mixture is forcibly burned by flame propagation that expands a combustion region from the ignition point to the surroundings. The CI combustion is a combustion mode in which an air-fuel mixture is burned by self-ignition in an environment of high temperature and high pressure due to compression of the piston 5. The SPCCI combustion in which the SI combustion and the CI combustion are combined is a combustion mode in which a part of an air-fuel mixture in the combustion chamber 6 is subjected to SI combustion by spark ignition performed in an environment immediately before the air-fuel mixture self-ignites, and the remaining air-fuel mixture in the combustion chamber 6 is subjection to CI combustion by self-ignition after the SI combustion (with increased temperature and pressure in the SI combustion). "SPCCI" is an abbreviation for "Spark Controlled Compression Ignition".

Figure 8:
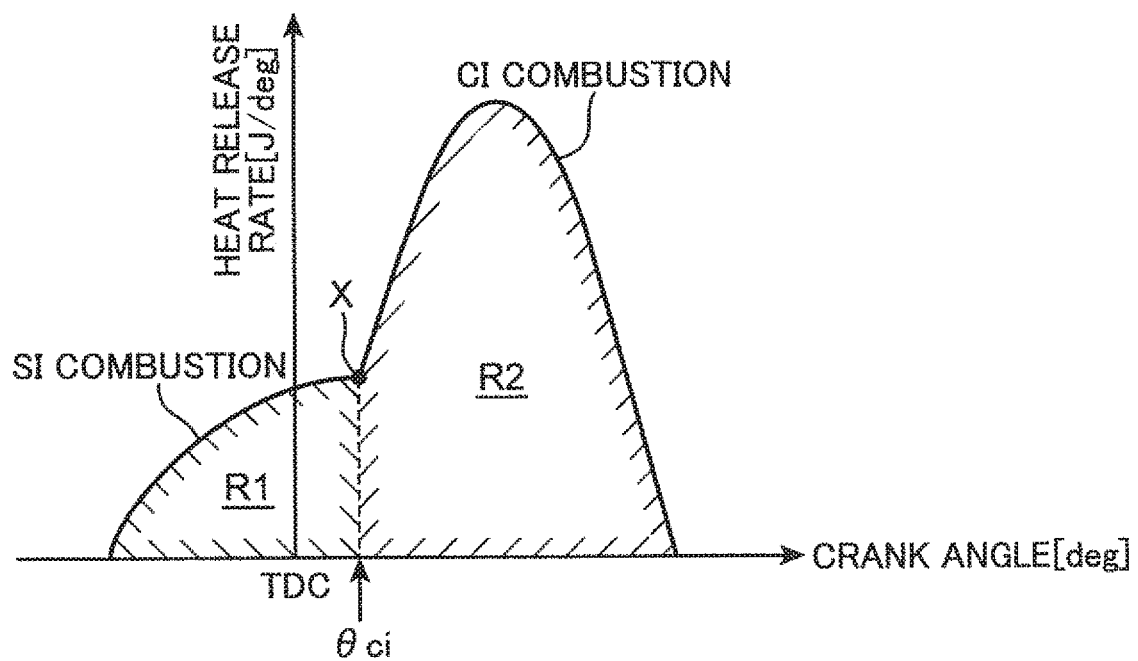
FIG. 8 is a graph illustrating a waveform of a heat release rate during SPCCI combustion.

The SPCCI combustion has a property that heat generation during CI combustion is sharper than heat generation during SI combustion. As illustrated in FIG. 8, in a waveform of a heat release rate due to SPCCI combustion, the rising inclination at the beginning of combustion corresponding to SI combustion is smaller than a rising inclination generated the following CI combustion. In other words, the waveform of the heat release rate during SPCCI combustion is formed such that a first heat release rate part having a relatively small rising inclination based on SI combustion and a second heat release rate part having a relatively large rising inclination based on CI combustion continue in this order. Further, in response to such a tendency of the heat release rate, in the SPCCI combustion, the pressure increase rate $(dp/d\theta)$ in the combustion chamber 6 generated during SI combustion is smaller than that during CI combustion.

When the temperature and pressure in the combustion chamber 6 increase due to the SI combustion, an unburned air-fuel mixture self-ignites and the CI combustion starts. As illustrated in FIG. 8, the inclination of the waveform of the heat release rate changes from small to large at the timing of the self-ignition (that is, timing when CI combustion starts). That is, the waveform of the heat release rate in SPCCI combustion has an inflection point (point X in FIG. 8) that appears at the timing when the CI combustion starts.

After the CI combustion starts, the SI combustion and the CI combustion are performed in parallel. Since the combustion speed of an air-fuel mixture is faster in CI combustion than in SI combustion, the heat release rate is relatively large. However, since the CI combustion is performed after a compression top dead center, the inclination of the waveform of the heat release rate does not become excessive. That is, as the motoring pressure decreases due to lowering of the piston 5 after the compression top dead center, this prevents an increase in heat release rate. As a result, it is possible to prevent $dp/d\theta$ during CI combustion from becoming excessive. As described above, since the CI combustion is performed after the SI combustion in the SPCCI combustion, $dp/d\theta$, which is an index of combustion noise, hardly increases excessively, and the combustion noise can be reduced as compared to simple CI combustion (when all fuels are subjected to CI combustion).

When the CI combustion ends, the SPCCI combustion also ends. Since the combustion speed of CI combustion is higher than that of SI combustion, the time when combustion ends can be earlier than the time when simple SI combustion ends (when all fuels are subjected to SI combustion). Consequently, in SPCCI combustion, the time when combustion ends can be close to the compression top dead center in an expansion stroke. As a result, fuel efficiency can be improved in the SPCCI combustion as compared to the simple SI combustion.

In the first area A1, the SPCCI combustion described above is performed in a lean environment (SPCCI_λ>1). That is, the opening of the throttle valve 32 is set to an opening at which the amount of air more than the amount of air equivalent to a stoichiometric air-fuel ratio is introduced in the combustion chamber 6 through the intake passage 30. Specifically, the processor 60 executes control of performing SPCCI combustion of an air-fuel mixture in the combustion chamber 6 while setting an air-fuel ratio (A/F) that is a weight ratio of air (fresh air) introduced in the combustion chamber 6 through the intake passage 30 to fuel injected into the combustion chamber 6 by the injector 15 to be larger than the stoichiometric air-fuel ratio (14.7).

In many regions in the first area A1, the internal EGR that leaves burned gas in the combustion chamber 6 is performed. The processor 60 controls the intake VVT 13a and the exhaust VVT 14a to drive the intake valve 11 and the exhaust valve 12 so that a valve overlap in which both the intake valve 11 and the exhaust valve 12 are opened across an exhaust top dead center is formed, thus opening the exhaust valve 12 until the exhaust top dead center is passed (until the beginning of an intake stroke). The burned gas is thus drawn back from the exhaust port 10 to the combustion chamber 6, and the internal EGR is achieved. The valve overlap period is set so as to achieve an in-cylinder temperature suitable for obtaining a desired SPCCI combustion waveform.

In the second area A2, control of performing the SPCCI combustion of an air-fuel mixture in an environment in which the air-fuel ratio in the combustion chamber 6 substantially matches the stoichiometric air-fuel ratio (SPCCI_λ=1) is executed. The opening of the throttle valve 32 is set to an opening at which the amount of air equivalent to the stoichiometric air-fuel ratio is introduced in the combustion chamber 6 through the intake passage 30. In the second operation area A2, the EGR valve 53 is opened and external EGR gas is introduced in the combustion chamber 6. For this reason, in the second operation area A2, a gas air-fuel ratio (G/F) that is the weight ratio of all the gas to fuel in the combustion chamber 6 is larger than the stoichiometric air-fuel ratio (14.7). Consequently, during operation in the second area A2, control of performing the SPCCI combustion of the air-fuel mixture while forming a G/F lean environment in which G/F is larger than the stoichiometric air-fuel ratio and A/F substantially matches the stoichiometric air-fuel ratio is executed. The opening of the EGR valve 53 is set to an opening at which the stoichiometric air-fuel ratio is achieved on an A/F basis.

In the third area A3, control of performing the SPCCI combustion of an air-fuel mixture in an environment in which A/F in the combustion chamber 6 is slightly richer than the stoichiometric air-fuel ratio (SPCCI_λ≤1) is executed. To respond to a medium speed and a high load, the fuel injection amount corresponding to the medium speed and the high load is required, and thus a rich environment is set. Meanwhile, in the fourth area A4 that is a high load but low speed operation area, control of performing the SPCCI combustion of an air-fuel mixture in an environment in which A/F substantially matches the stoichiometric air-fuel ratio (SPCCI_λ=1) is executed. In the fifth area A5, relatively orthodox SI combustion is performed. A/F is set to the stoichiometric air-fuel ratio or a value slightly richer than the stoichiometric air-fuel ratio (SI_λ≤1). Note that the A/F can be adjusted by the opening degree of the EGR valve 53 also in these areas A3 to A5.

<Half Warmed-Up State>

In the second operation map Q2 in a half warmed-up state, the sixth area B1 corresponds to an area obtained by combining the first area A1 and the second area A2 in the first operation map Q1. The seventh area B2, the eighth area B3, and the ninth area B4 respectively correspond to the third area A3, the fourth area A4, and the fifth area A5 in the first operation map Q1.

In the sixth area B1, as in the second area A2 in the first operation map Q1, control of performing the SPCCI combustion of an air-fuel mixture in an environment in which A/F in the combustion chamber 6 substantially matches the stoichiometric air-fuel ratio (SPCCI_λ=1) is executed. In at least a part of the sixth area B1, the internal EGR that sets a valve overlap period and leaves burned gas in the combustion chamber 6 is executed. The supercharger 33 is turned on in a relatively high load region and a relatively high speed region of the sixth area B1, and is turned off in other regions. In a specific region B11 of the sixth area B1, the specific region B11 being a part of the region where the internal EGR is performed and the supercharger 33 is turned off, re-intake correction control to be described later in detail is executed.

In the seventh area B2, the eighth area B3, and the ninth area B4, control similar to that in the third area A3, the fourth area A4, and the fifth area A5, respectively in the first operation map Q1 is executed. That is, in the seventh area B2, the SPCCI combustion of an air-fuel mixture is performed in the environment in which A/F in the combustion chamber 6 is slightly richer than the stoichiometric air-fuel ratio (SPCCI_λ≤1). In the eighth area B3, the SPCCI combustion of an air-fuel mixture is performed in the environment in which A/F substantially matches the stoichiometric air-fuel ratio (SPCCI_λ=1). In the ninth area B4, orthodox SI combustion is performed, and the A/F is set to the stoichiometric air-fuel ratio or a value slightly richer than the stoichiometric air-fuel ratio (SI_λ≤1).

<Cold State>

The third operation map Q3 in a cold state includes only a tenth operation area C1. In the tenth area C1, control of performing SI combustion while mixing fuel injected mainly during an intake stroke with air is executed. The control in the tenth area C1 is similar to the combustion control of a typical gasoline engine.

[SI Rate]

In the present embodiment, the SPCCI combustion in which SI combustion is combined with CI combustion is performed in the first to fourth areas A1 to A4 in the first operation map Q1 and the sixth to eighth areas B1 to B3 in the second operation map Q2. In the SPCCI combustion, it is important to control the ratio of SI combustion and CI combustion according to operation conditions. In the present embodiment, control is executed by using a SI rate that is the ratio of the amount of heat generated by SI combustion to the total amount of heat generated during one cycle of SPCCI combustion as the ratio described above. FIG. 8 is also a graph for explaining the SI rate, and illustrates a change in heat release rate (J/deg) with respect to a crank angle during SPCCI combustion.

The point X in the waveform of FIG. 8 is an inflection point that appears when the combustion mode switches from SI combustion to CI combustion. The crank angle θci at the inflection point X is defined as a start time of CI combustion. An area R1 of the waveform of heat release rates located closer to an advanced side than θci that is the start time of CI combustion is defined as the amount of heat generated by SI combustion, and an area R2 of the waveform of heat release rates located closer to a retarded side than θci is defined as the amount of heat generated by CI combustion. The SI rate described above and defined as (amount of heat generated by SI combustion)/(amount of heat generated by SPCCI combustion) is represented by R1/(R1+R2) using the areas R1 and R2 described above. That is, SI rate=R1/(R1+R2).

As the air-fuel mixture burns simultaneously and frequently by self-ignition in CI combustion, the pressure rise rate tends to be higher than that of SI combustion caused by flame propagation. For this reason, particularly if the SI rate is carelessly reduced under conditions that the load is high and the fuel injection amount is large, a loud noise is generated. On the other hand, CI combustion does not occur unless the temperature and pressure of the combustion chamber 6 are sufficiently increased. For this reason, under conditions that the load is low and the fuel injection amount is small, CI combustion does not start until SI combustion progresses to some extent, and thus the SI rate inevitably increases.

In consideration of such circumstances, in the present embodiment, a target SI rate that is the target value of the SI rate is determined in advance for each engine operating condition in the operation area where SPCCI combustion is performed. In addition, along with the target SI rate, a target θci that is the start time of CI combustion when combustion suitable for the target SI rate is performed is also determined in advance for each engine operating condition.

In order to achieve the target SI rate and the target θci described above, it is necessary to adjust control amounts such as the time of main ignition by the spark plug 16, the injection amount/injection time of fuel from the injector 15, and EGR rates (external EGR rate and internal EGR rate) for each operation condition. For example, as the main ignition time is advanced, more fuel is burned by SI combustion and thus the SI rate becomes higher. Further, as the fuel injection time is advanced, more fuel is burned by CI combustion and thus the SI rate becomes lower. Alternatively, as the in-cylinder temperature increases with an increase in the EGR rate, more fuel is burned by CI combustion and thus the SI rate becomes lower. Moreover, as a change in the SI rate is accompanied by a change in θci, changes in these control amounts (main ignition time, injection time, EGR rate, and the like) are elements for adjusting θci. According to the present embodiment, in SPCCI combustion, the main ignition time, the fuel injection amount/fuel injection time, the EGR rate (hence, in-cylinder temperature), and the like are controlled so as to form combinations that can achieve the target SI rate and the target θci described above.

[Mode of Performing Internal EGR]

Next, a mode of performing internal EGR will be described. In the present embodiment, the internal EGR due to a valve overlap in which both the intake valve 11 and the exhaust valve 12 are opened is performed at least in the sixth area B1 (specific region B11) in the second operation map Q2 in the half warmed-up state and the first area A1 in the first operation map Q1 in the warm state. The mode of performing the internal EGR in the sixth area B1 (SPCCI_λ=1) in which SPCCI combustion is performed by setting A/F to a stoichiometric air-fuel ratio is different from the mode of performing the internal EGR in the first area A1 (SPCCI_λ>1) in which SPCCI combustion is performed by setting lean A/F.

Figure 9A:
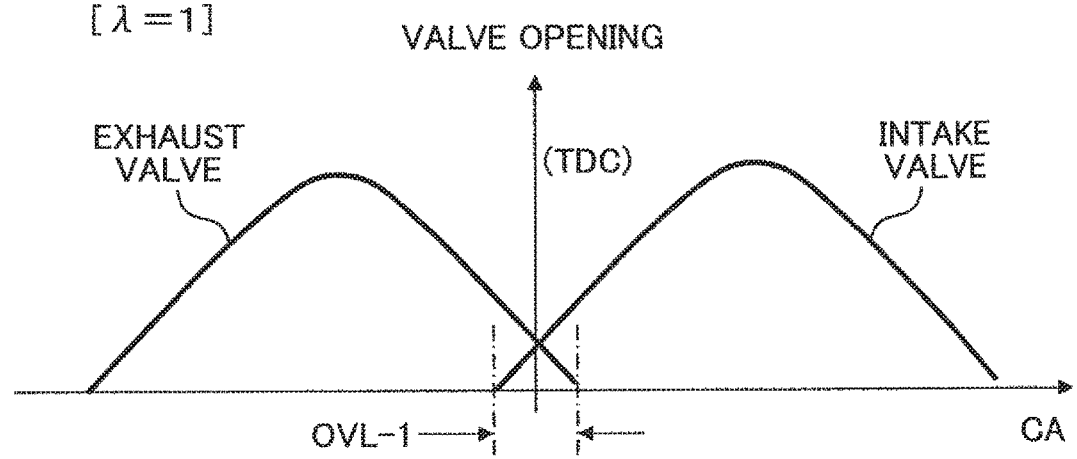
FIG. 9A is a graph illustrating a valve overlap period during $\lambda=1$ combustion.

FIG. 9A is a graph illustrating an example of a valve overlap period OVL-1 at a time of SPCCI_λ=1 combustion in the sixth area B1. A close time EVC of the exhaust valve 12 is set to a crank angle (CA) retarded from TDC, and an open time IVO of the intake valve 11 is set to a crank angle advanced from TDC. During the valve overlap period OVL-1, both the intake valve 11 and the exhaust valve 12 are opened and exhaust gas has a high pressure than intake air, and thus burned gas once discharged from the exhaust port 10 returns to the cylinder 2. In addition, due to the return of the burned gas, intake air once entering the cylinder 2 is blown out of the intake port 9 to the side of the intake passage 30. The intake air blown out is then re-intaken into the intake port 9. In the operation area of SPCCI_λ=1, the interval between the close time EVC of the exhaust valve 12 and the open time IVO of the intake valve 11 is set relatively short.

Figure 9B:
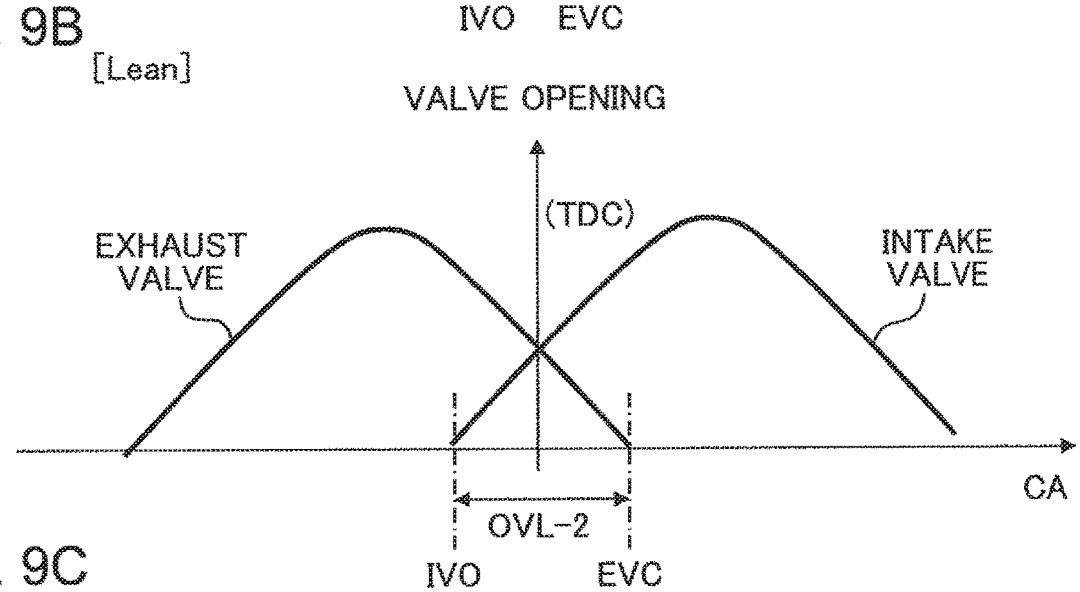
FIG. 9B is a graph illustrating a valve overlap period during lean combustion.

FIG. 9B is a graph illustrating an example of a valve overlap period OVL-2 at a time of SPCCI_λ>1 combustion in the first area A1. As compared to the SPCCI_λ=1 combustion illustrated in FIG. 9A, the close time EVC of the exhaust valve 12 is more retarded and the open time IVO of the intake valve 11 is more advanced. As a result, the valve overlap period OVL-2 is considerably longer than the valve overlap period OVL-1. This is because ignitability is degraded when SPCCI combustion is performed in a lean environment, and thus it is necessary to increase an internal EGR amount for the purpose of increasing an in-cylinder temperature.

Figure 9C:
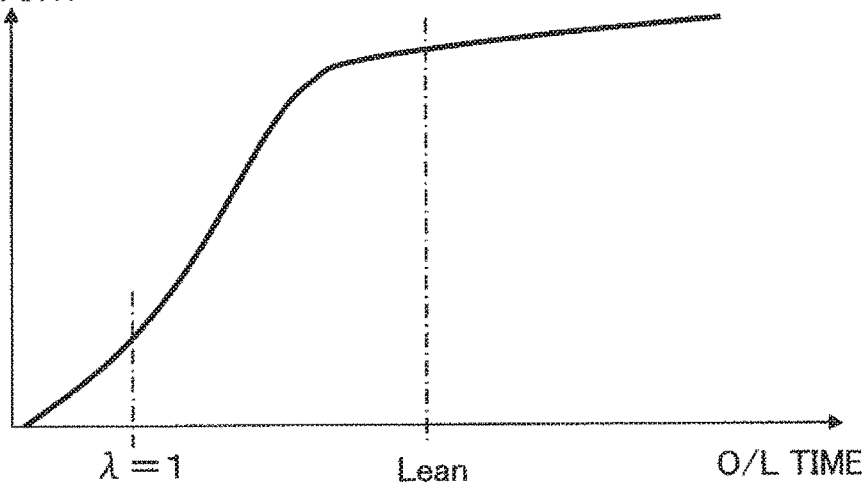
FIG. 9C is a graph illustrating a relationship between a return amount of burned gas and a valve overlap time.

FIG. 9C is a graph illustrating a relationship between a return amount of burned gas (internal EGR amount) and a valve overlap time. The return amount tends to increase as the valve overlap time increases. FIG. 9C illustrates the return amount at the time of SPCCI_λ=1 combustion in FIG. 9A and the return amount at the time of SPCCI_λ>1 combustion in FIG. 9B when the engine speed is the same. Based on the difference between the valve overlap periods OVL-1 and OVL-2, the return amount at the time of SPCCI_λ>1 combustion is considerably larger. In some cases, OVL-2 is set to be larger than OVL-1 by about +30 deg of crank angle CA. In this case, the burned gas having returned from the exhaust port 10 into the cylinder 2 may even be blown out of the intake port 9.

The degree of variation in air-fuel ratio among the #1 to #4 cylinders 2 may differ depending on the return amount of burned gas. As described above, in the present embodiment, the surge tank 36 in the intake passage 30 employs the center intake structure, and the independent intake passage 37 is very short. On the other hand, the exhaust manifold 42 in the exhaust passage 40 has the end uneven exhaust structure in which the exhaust flow path length of the #1 cylinder 2 is the shortest.

In a case of SPCCI_λ=1 combustion in which the close time EVC of the exhaust valve 12 is relatively early, the exhaust valve 12 is closed before shape characteristics of the end uneven exhaust structure on an exhaust side affect the return state of burned gas. For this reason, the state of the re-intake of intake air mainly due to the center intake structure on an intake side causes a variation in air-fuel ratio between the cylinders 2. On the other hand, in a case of SPCCI_λ>1 combustion in which the close time EVC is relatively late, the return amount of burned gas increases significantly. For this reason, the state of return of burned gas mainly due to shape characteristics of the end uneven exhaust structure on the exhaust side causes a variation in air-fuel ratio between the cylinders 2.

[Behaviors of Intake Air and Exhaust Gas During Internal EGR]

Figure 10:
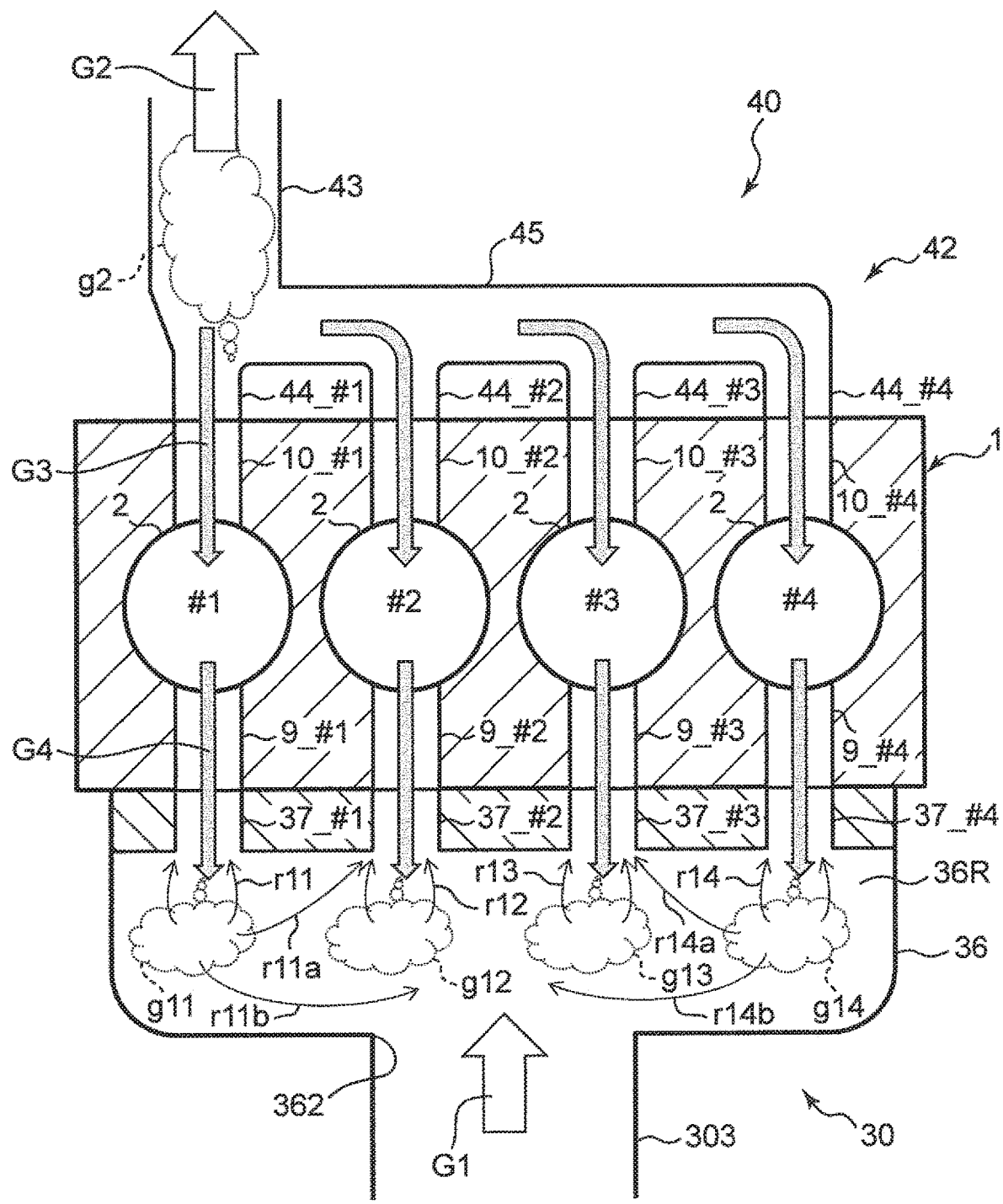
FIG. 10 is a schematic diagram for explaining a state of return of exhaust gas to cylinders, return of intake air, and re-intake of the intake air when internal EGR is performed.

FIG. 10 is a schematic diagram for explaining a state of return of exhaust gas to cylinders, return of intake air, and re-intake of the intake air when internal EGR is performed. Intake air G1 is introduced into the surge tank 36 from the third passage 303 of the intake passage 30. Exhaust gas G2 after combustion is sent to the exhaust pipe 43 via the exhaust manifold 42. On the other hand, when the internal EGR is performed, return exhaust gas G3 is generated, that is, a part of the exhaust gas G2 returns to each of the #1 to #4 cylinders 2 due to setting of a valve overlap period and an intake/exhaust differential pressure. Return intake air G4 is then generated, that is, the intake air G1 once introduced into each of the #1 to #4 cylinders 2 is pushed out by the return exhaust gas G3 to be blown out.

First, a behavior of the return intake air G4 will be described. As the independent intake passages 37_#1 to #4 respectively corresponding to the #1 to #4 cylinders 2 are short, the return intake air G4 is sometimes blown out to the surge tank 36 through the independent intake passages 37_#1 to #4. In FIG. 10, reference signs g11, g12, g13, and g14 schematically indicate blow-out intake air returning from the independent intake passages 37_#1, 37_#2, 37_#3, and 37_#4 to the surge tank 36, respectively.

When the independent intake passages 37_#1 to #4 are long, the return intake air G4 blows out into each of the independent intake passages 37_#1 to #4 and then is re-intaken into each intake port 9. Consequently, there is no variation in air-fuel ratio among the #1 to #4 cylinders 2. However, if the return intake air G4 blows out to the internal space 36R of the surge tank 36, the air-fuel ratio varies. Specifically, in the center intake structure as in the present embodiment, the air-fuel ratio varies between the #1 and #4 cylinders 2 (first cylinders/end-side cylinders) located at both ends and the two #2 and #3 cylinders 2 (second cylinders/center-side cylinders) sandwiched between the #1 and #4 cylinders 2, among the four cylinders 2 arranged in a line.

The blow-out intake air g11 from the #1 cylinder 2 is focused on. With the progression of an internal combustion cycle, most of the blow-out intake air g11 returns to the independent intake passage 37_#1 from which the blow-out intake air g11 is blown out as indicated by arrows r11 and is re-intaken into the #1 cylinder 2 through the intake port 9_#1. However, because of the center intake structure, a part of the blow-out intake air g11 is affected by the flow tendency of the intake air G1 to flow toward the #2 and #3 cylinders 2 on the center side to move freely in the internal space 36R of the surge tank 36. As indicated by arrows r11a and r11b, a part of the blow-out intake air g11 enters the adjacent independent intake passage 37_#2 or moves toward the other independent intake passages 37_#3 and #4. Due to such a behavior, all the blow-out intake air g11 does not return to the #1 cylinder 2, and as a result, the amount of air in the #1 cylinder 2 is insufficient.

The same applies to the blow-out intake air g14 from the #4 cylinder 2. Most of the blow-out intake air g14 blown out to the internal space 36R returns to the independent intake passage 37_#4, and is re-intaken into the #4 cylinder 2 through the intake port 9_#4. However, as indicated by arrows r14a and r14b, a part of the blow-out intake air g14 enters the adjacent independent intake passage 37_#3 or moves toward the other independent intake passages 37_#1 and #2. Due to this behavior, the amount of air in the #4 cylinder 2 is also insufficient.

On the other hand, the amount of air in the #2 and #3 cylinders 2 is excessive. That is, the blow-out intake air g12 from the #2 cylinder 2 is assisted by the flow of the intake air G1 to substantially entirely return to the independent intake passage 37_#2 from which the blow-out intake air g12 is blown out as indicated by arrows r12 and is re-intaken into the #2 cylinder 2 through the intake port 9_#2. Similarly, the blow-out intake air g13 from the #3 cylinder 2 substantially entirely returns to the independent intake passage 37_#3 from which the blow-out intake air g13 is blown out as indicated by arrows r13 and is re-intaken into the #3 cylinder 2 through the intake port 9_#3.

In addition, a part of the blow-out intake air g11 from the #1 cylinder 2 (arrow r11a) and a part of the blow-out intake air g14 from the #4 cylinder 2 (arrow r14b) may be intaken into the independent intake passage 37_#2. Similarly, a part of the blow-out intake air g14 from the #4 cylinder 2 (arrow r14a) and a part of the blow-out intake air g11 from the #1 cylinder 2 (arrow r11b) may be intaken into the independent intake passage 37_#3. Consequently, the re-intake amount of intake air at the intake ports 9_#2 and #3 of the #2 and #3 cylinders 2 is larger than the original amount of the return intake air G4. Due to the above behavior, a variation occurs in which the re-intake amount of intake air in the #2 and #3 cylinders 2 is larger than the re-intake amount (predetermined amount) of intake air in the #1 and #4 cylinders 2.

The behavior of the return intake air G4 described above is not apparent in an operating state where the intake air pressure is relatively high (intake air pressure difference is small). For example, when the supercharger 33 operates to increase the intake air pressure, the return intake air G4 does not blow out to the surge tank 36 even if the independent intake passage 37 is short. Further, when the EGR valve 53 is opened and external EGR enters the surge tank 36, the external EGR shows a behavior of entering each cylinder 2 so as to offset the variation of the re-intake amount. As a result, the air-fuel ratio does not vary among the #1 to #4 cylinders 2.

Next, a behavior of the return exhaust gas G3 will be described. As illustrated in FIG. 5, the exhaust manifold 42 has the end uneven exhaust structure in which the independent exhaust pipe 44_#1 for the #1 cylinder 2 (fourth cylinder) has the shortest path to the exhaust pipe 43, and the independent exhaust pipes 44_#2 to #4 for the #2 to #4 cylinders 2 (third cylinders) have the paths gradually longer with respect to the path to the exhaust pipe 43. When the internal EGR is performed, blow-out exhaust gas g2 that is burned gas once blown out to the joining part 45 or the exhaust pipe 43 of the exhaust manifold 42 returns as the return exhaust gas G3 to the #1 to #4 cylinders 2 through the independent exhaust pipes 44_#1 to #4 and the exhaust ports 10_#1 to #4.

As the independent exhaust pipe 44_#1 communicates linearly with the exhaust pipe 43 and has the shortest path length, the blow-out exhaust gas g2 is most likely to return to the #1 cylinder 2 and most difficult to return to the #4 cylinder 2. The independent exhaust pipes 44_#1 to #4 are not as short as the independent intake passages 37_#1 to #4 on the intake side. For this reason, when it is not apparent in SPCCI_$\lambda$=1 combustion with the internal EGR amount in which the return amount of burned gas is small, but in SPCCI_$\lambda$>1 combustion with the internal EGR amount in which the return amount is large, G/F varies among the #1 to #4 cylinders 2 due to the blow-out exhaust gas g2 easily returning. It is needless to mention that the re-intake amount of burned gas in the #1 cylinder 2 (one-end-side cylinder)

tends to be large, and the re-intake amount of the #2 to #4 cylinders 2 (remaining three cylinders) tends to be small.

[Specific Re-Intake Correction Amount]

FIGS. 11A to 11D are graphs illustrating a correction tendency of a fuel injection amount of the #1 to #4 cylinders 2 in an operation area of SPCCI_$\lambda$=1. The BGR ratio on a horizontal axis of these graphs is an index indicating the remaining amount of burned gas in the cylinder 2 (combustion chamber 6). A larger BGR ratio indicates a larger amount of burned gas (that is, larger internal EGR amount). The sign "+" on a vertical axis indicates a correction for increasing a target fuel injection amount, and the sign "−" indicates a correction for decreasing the target fuel injection amount.

The correction amount of the target fuel injection amount illustrated in these graphs is a specific correction amount determined by the center intake structure employed in the present embodiment. That is, the correction amount is a specific re-intake correction amount set in each of the #1 to #4 cylinders 2 according to the re-intake amount of intake air in the internal EGR in each cylinder 2 illustrated in FIG. 10. The first correction unit 65 (FIG. 6) primarily corrects the target fuel injection amounts set in the #1 to #4 cylinders 2 based on these re-intake correction amounts. The storage unit 68 stores table data of the re-intake correction amount corresponding to each of the graphs.

As described above, the re-intake amount of intake air is relatively small in the #1 and #4 cylinders 2 (first cylinders/end-side cylinders). On the other hand, the re-intake amount of intake air is relatively large in the #2 and #3 cylinders 2 (second cylinders/center-side cylinders). In this case, if the fuel injection is performed in the #1 to #4 cylinders 2 with the target fuel injection amount, the amount of air in the #1 and #4 cylinders 2 is insufficient and thus A/F becomes rich, whereas the amount of air in the #2 and #3 cylinder 2 is excessive and thus the A/F becomes lean. As a result, the A/F varies. To correct this variation, the target fuel injection amount may be corrected so that the A/F is on a lean side in the #1 and #4 cylinders 2 and the A/F is on a rich side in the #2 and #3 cylinders 2.

Figure 11A:
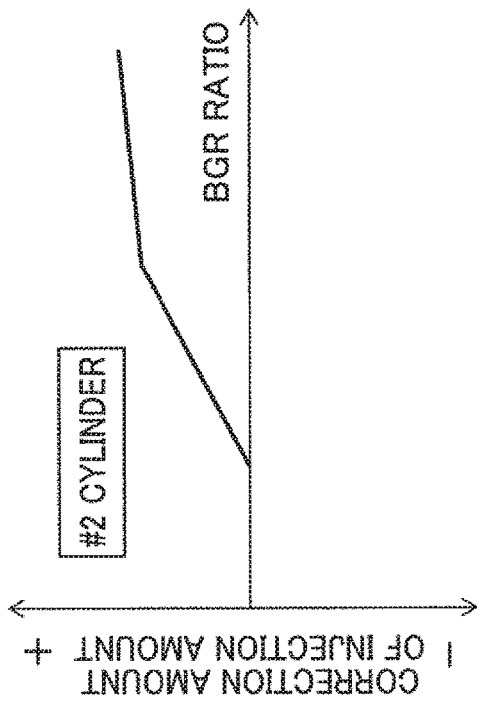
FIGS. 11A to 11D are graphs illustrating a correction tendency of a fuel injection amount of each cylinder in an operation area of $\lambda=1$.
Figure 11B:
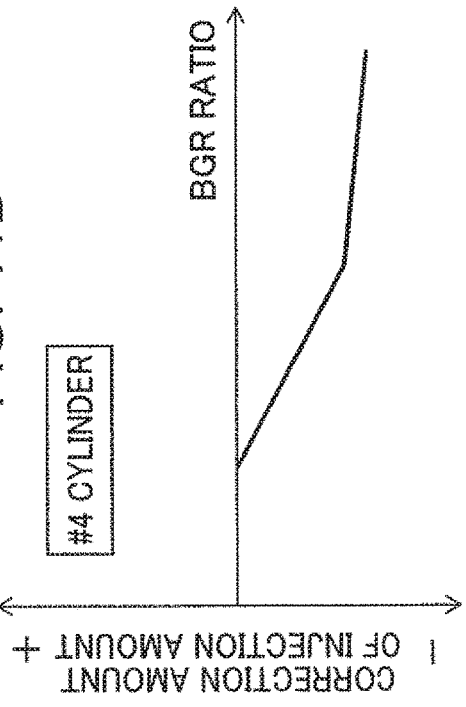
Figure 11C:
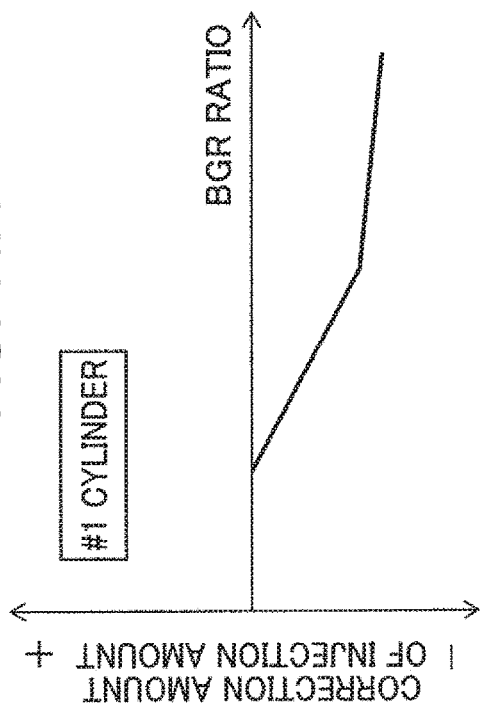
Figure 11D:
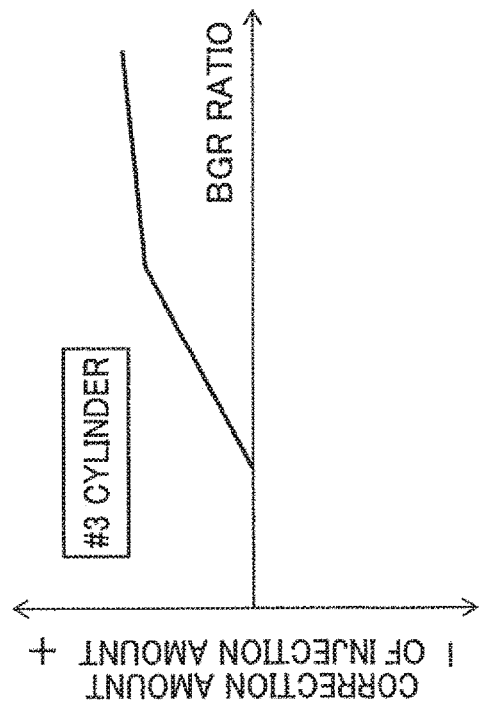

Specifically, as illustrated in FIG. 11A and FIG. 11D, the re-intake correction amount for reducing the target fuel injection amount is set in #1 and #4 cylinders 2. Consequently, the #1 and #4 cylinders 2 in which the A/F is rich due to the insufficient re-intake amount can approach $\lambda$=1. In addition, the degree of reduction of the target fuel injection amount is set so as to increase with an increase in the BGR ratio. This is in order to handle a tendency in which the larger the internal EGR amount is, the larger the amount of the return intake air G4 blown out to the surge tank 36 is, and thus the variation in A/F between the cylinders 2 increases.

On the other hand, as illustrated in FIG. 11B and FIG. 11C, the re-intake correction amount for increasing the target fuel injection amount is set in the #2 and #3 cylinders 2, and the degree of increase is set to increase with the increase in the BGR ratio. By performing such a correction, the #2 and #3 cylinders 2 in which the A/F is lean due to the excessive re-intake amount can approach $\lambda$=1.

FIGS. 12A to 12D are graphs illustrating a correction tendency of a fuel injection amount of the #1 to #4 cylinders 2 in an operation area of SPCCI_$\lambda$>1. The correction amount of the target fuel injection amount illustrated in these graphs is a specific correction amount determined by the end uneven exhaust structure of the exhaust manifold 42 employed in the present embodiment. The first correction unit 65 primarily corrects the target fuel injection amounts set in the #1 to #4 cylinders 2 based on these specific correction amounts. The storage unit 68 stores table data of the correction amount corresponding to each of the graphs.

As described above, the re-intake amount of burned gas from the exhaust port 10 is relatively large in the #1 cylinder 2 (fourth cylinder/one-end-side cylinder). On the other hand, the re-intake amount of burned gas is relatively small in the #2 to #4 cylinders 2 (third cylinders/remaining three cylinders). In this case, if the fuel injection is performed in the #1 to #4 cylinders 2 with the target fuel injection amount, the amount of gas containing air in the #1 cylinder 2 is excessive and thus G/F becomes lean, whereas the amount of gas in the #2 to #4 cylinder 2 is insufficient and thus the G/F becomes rich. As a result, the G/F varies. To correct this variation, the target fuel injection amount may be corrected so that the G/F is on the rich side in the #1 cylinder 2 and the G/F is on the lean side in the #2 to #4 cylinders 2.

Figure 12B:
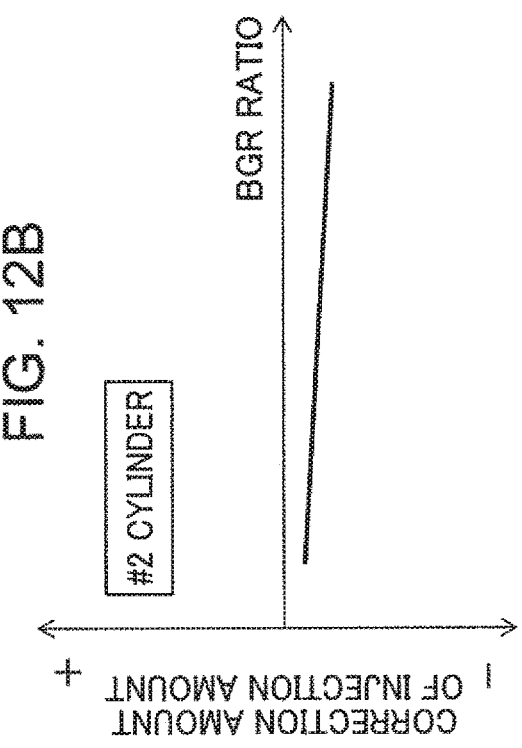
FIGS. 12A to 12D are graphs illustrating a correction tendency of a fuel injection amount of each cylinder in an operation area of λ>1.
Figure 12D:
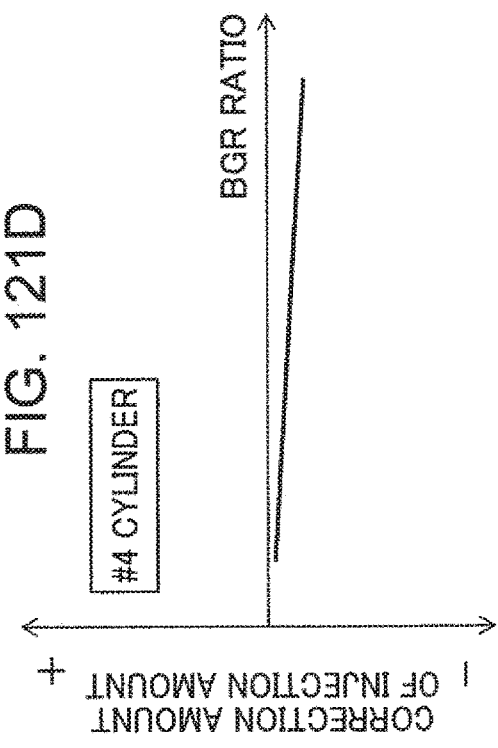
Figure 12A:
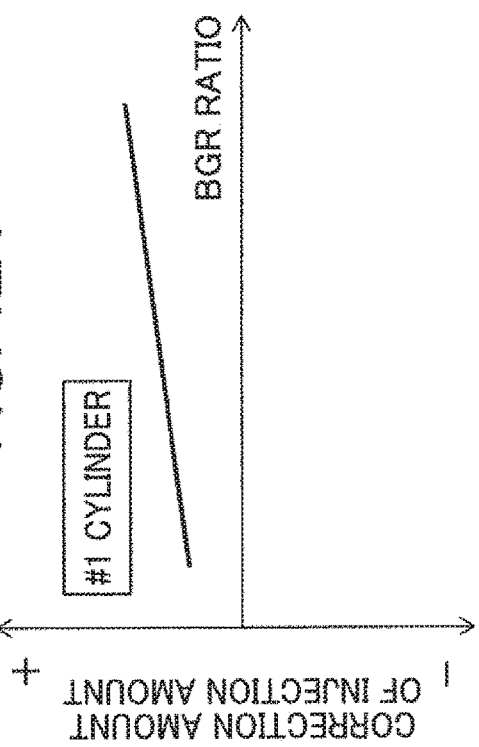

Specifically, as illustrated in FIG. 12A, the correction amount for increasing the target fuel injection amount is set in #1 cylinder 2. Consequently, the #1 cylinder 2 in which G/F is moved to the rich side due to the insufficient re-intake amount can approach target G/F. In addition, the degree of increase of the target fuel injection amount is set so as to increase with an increase in the BGR ratio. This is in order to handle a tendency in which the larger the internal EGR amount is, the larger the amount of the return exhaust gas G3 from the exhaust pipe 43 is, and thus the variation in G/F between the cylinders 2 increases.

Figure 12C:
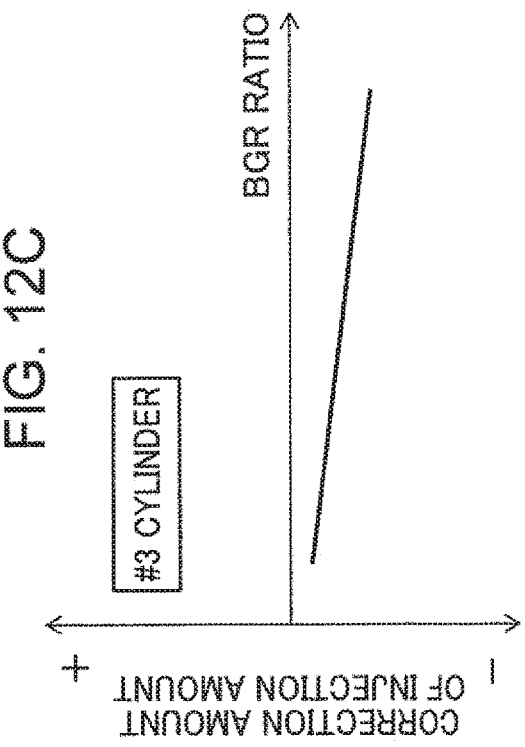

On the other hand, as illustrated in FIG. 12B, FIG. 12C, and FIG. 12D, the correction amount for reducing the target fuel injection amount is set in the #2, #3, and #4 cylinders 2, and the degree of reduction is set to increase with the increase in the BGR ratio. By performing such a correction, the #2, #3, and #4 cylinders 2 in which the G/F is lean due to the excessive amount of the return exhaust gas G3 can approach the target G/F.

[Correction of Specific Re-Intake Correction Amount]

In the present embodiment, the second correction unit 66 (FIG. 6) further corrects at least the specific re-intake correction amount of each cylinder 2 illustrated in FIGS. 11A to 11D according to various operation conditions and environmental conditions. Examples of the operation conditions and environmental conditions include an intake air pressure, a valve overlap amount, a close time of the exhaust valve 12, an engine speed, an atmospheric pressure, and an exhaust gas temperature. These are variables that affect the amount of burned gas returned to the cylinder 2 by internal EGR. When the return amount of burned gas changes, the amount of intake air blown out of the intake port 9 also changes. For example, the amount of the blow-out intake air g11 to g14 (see FIG. 10) entering the surge tank 36 changes. For this reason, the mode of re-intake of the blow-out intake air g11 to g14 may also change. Consequently, it is preferable to secondarily correct the re-intake correction amount according to the above-described conditions instead of fixedly setting the re-intake correction amount. The A/Fs of the #1 to #4 cylinders 2 can thus be matched more accurately.

Hereinafter, the mode of a secondary correction performed by the second correction unit 66 will be specifically described for each of the above-described conditions with reference to FIGS. 13A to 14C. FIGS. 13A to 13C and FIGS. 14A to 14C are graphs each illustrating a correction tendency of a specific re-intake correction amount for each variable depending on an operating state and environmental conditions. The reference sign "Ref" indicated in each graph means a reference value. When each variable has the reference value Ref, the secondary correction amount is ×1 time, and as a result, a value of the specific re-intake correction amount set by the first correction unit 65 is maintained. The area where the secondary correction amount is higher than the secondary correction amount at the reference value Ref is an area where the specific re-intake correction amount is increased, whereas the area where the secondary correction amount is lower than the secondary correction amount at the reference value Ref is an area where the specific re-intake correction amount is reduced. For example, it is assumed that, in a certain internal EGR amount, the specific re-intake correction amount of a certain cylinder 2 has a correction value for increasing the target fuel injection amount by +3%. In this case, when the variable has the reference value Ref, the +3% increase is maintained. In the area where the secondary correction amount is higher than the secondary correction amount at the reference value Ref, for example, +3% is increased to +3.5%, and in the area where the secondary correction amount is lower than the secondary correction amount at the reference value Ref, for example, +3% is reduced to +2.5%.

<Intake Air Pressure>

Figure 13A:
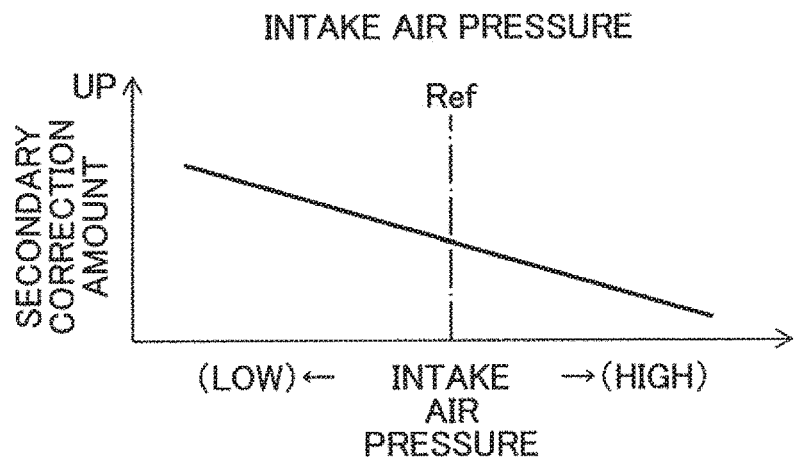
FIGS. 13A to 13C are graphs each illustrating a variable depending on an operating state and a correction tendency of a specific re-intake correction amount.

FIG. 13A is a graph illustrating a relationship between an intake air pressure and a secondary correction amount of a specific re-intake correction amount. As illustrated in this graph, the second correction unit 66 corrects to reduce the re-intake correction amount as the intake air pressure increases. That is, the correction to reduce the re-intake correction amount is performed when the intake air pressure is higher than the reference value Ref, and the correction to increase the re-intake correction amount is performed when the intake air pressure is lower than the reference value Ref. The intake air pressure can be recognized by measured values of the first intake air pressure sensor SN6 and the second intake air pressure sensor SN8.

The return amount of burned gas to the cylinder 2 in the internal EGR depends on the magnitude of an intake/exhaust differential pressure that is the difference between an intake air pressure and an exhaust pressure. If the intake/exhaust differential pressure is high, the return amount of exhaust gas (burned gas) on a high-pressure side increases, and intake air is blown out of the cylinder 2 accordingly. When the intake air pressure is relatively higher than an exhaust pressure, the amount of intake air blown out of the intake port 9 itself is reduced as the intake/exhaust differential pressure is reduced, and thus the re-intake amount is reduced accordingly. For this reason, the variation in re-intake amount among the #1 to #4 cylinders 2 is also reduced. By performing a correction to reduce the re-intake correction amount as the intake air pressure increases, the target fuel injection amount can be corrected according to an actual state. For simplicity of control, when the intake air pressure exceeds a predetermined threshold or when the intake/exhaust differential pressure is lower than a predetermined threshold value, control may be executed so that the re-intake correction itself is not performed.

As illustrated in FIG. 11A and FIG. 11D, in a primary correction, the re-intake correction amount for reducing the target fuel injection amount is set in #1 and #4 cylinders 2. For the #1 and #4 cylinders 2, in the area where the intake air pressure is higher than the reference value Ref, the secondary correction for reducing the re-intake correction amount is performed so as to reduce the degree of reduction of the target fuel injection amount. For example, it is assumed that, in a certain internal EGR amount, the specific re-intake correction amount of the #1 cylinder 2 has a correction value for reducing the target fuel injection amount by −3%. In this case, in the area where the intake air pressure is higher than the reference value Ref, the −3% reduction described above is secondarily corrected to, for example, a −2.5% reduction. Conversely, in the area where the intake air pressure is lower than the reference value Ref, the −3% reduction described above is secondarily corrected to, for example, a −3.5% reduction. When the intake air pressure is equal to the reference value Ref, the −3% reduction is maintained.

On the other hand, as illustrated in FIG. 11B and FIG. 11C, in a primary correction, the re-intake correction amount for increasing the target fuel injection amount is set in the #2 and #3 cylinders 2. For these #2 and #3 cylinders 2, in the area where the intake air pressure is higher than the reference value Ref, the secondary correction for increasing the re-intake correction amount is performed so as to reduce the degree of increase of the target fuel injection amount. For example, it is assumed that, in a certain internal EGR amount, the specific re-intake correction amount of the #2 cylinder 2 has a correction value for increasing the target fuel injection amount by +3%. In this case, in the area where the intake air pressure is higher than the reference value Ref, the +3% increase described above is secondarily corrected to, for example, a +2.5% increase. Conversely, in the area where the intake air pressure is lower than the reference value Ref, the +3% increase described above is secondarily corrected to, for example, a +3.5% increase. When the intake air pressure is equal to the reference value Ref, the +3% increase is maintained. Such a secondary correction of each cylinder 2 is similar to corrections in the following variables (description will be omitted below).

<Valve Overlap Amount>

Figure 13B:
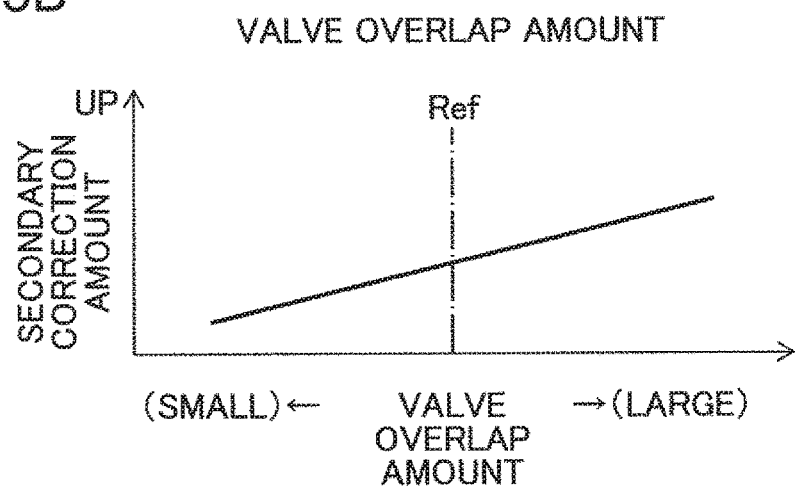

FIG. 13B is a graph illustrating a relationship between a valve overlap amount and a secondary correction amount of a specific re-intake correction amount. As illustrated in this graph, the second correction unit 66 corrects to increase the re-intake correction amount with an increase in the valve overlap amount. That is, the correction to increase the re-intake correction amount is performed when the valve overlap amount is higher than the reference value Ref, and the correction to reduce the re-intake correction amount is performed when the valve overlap amount is lower than the reference value Ref. The valve overlap amount can be recognized by measured values of the intake cam angle sensor SN12 and the exhaust cam angle sensor SN13.

Assuming that the engine speed is constant, if the valve overlap amount increases, the return amount of burned gas to the cylinder 2 also increases. In other words, as the period during which both the intake valve 11 and the exhaust valve 12 are open becomes longer, the burned gas returns to the cylinder 2 more easily. The amount of intake air blown out of the intake port 9 increases accordingly, so that the variation in the re-intake amount of intake air among the #1 to #4 cylinders 2 tends to increase. Consequently, by performing a correction to increase the re-intake correction amount with an increase in the valve overlap amount, it is possible to reduce a variation in A/F among the #1 to #4 cylinders 2.

<Close Time of Exhaust Valve>

Figure 13C:
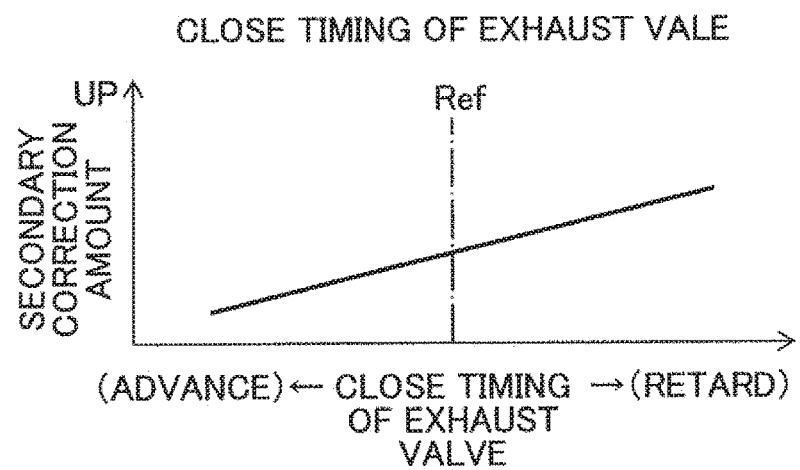

FIG. 13C is a graph illustrating a relationship between a close time of the exhaust valve 12 and a secondary correction amount of a specific re-intake correction amount. As illustrated in this graph, the second correction unit 66 corrects to increase the re-intake correction amount as the close time of the exhaust valve 12 becomes late. That is, the correction to increase the re-intake correction amount is performed when the close timing of the exhaust valve 12 is retarded from a reference close timing (Ref), and the correction to reduce the re-intake correction amount is performed when the close timing of the exhaust valve 12 is advanced from the reference close timing (Ref). The close time of the exhaust valve 12 can be recognized by a measured value of the exhaust cam angle sensor SN13, for example.

The later the close time of the exhaust valve 12 is, the larger the return amount of burned gas to the cylinder 2 is. In other words, since the close timing of the exhaust valve 12 is retarded, the period during which both the intake valve 11 and the exhaust valve 12 are open becomes longer, and thus the burned gas once discharged from the exhaust port 10 returns to the cylinder 2 more easily. The amount of intake air blown out of the intake port 9 increases accordingly, so that the variation in the re-intake amount of intake air among the #1 to #4 cylinders 2 tends to increase. Consequently, by performing a correction to increase the re-intake correction amount with the retard of the close time of the exhaust valve 12, it is possible to reduce a variation in A/F among the #1 to #4 cylinders 2.

<Engine Speed>

Figure 14A:
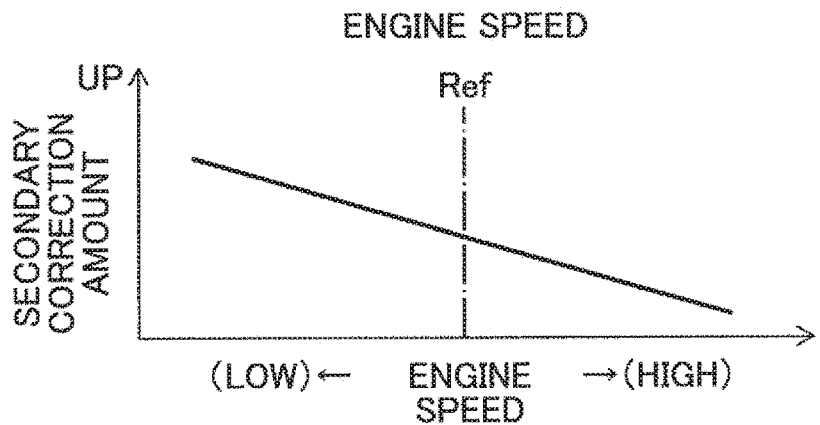
FIGS. 14A to 14C are graphs each illustrating the variable depending on the operating state and the correction tendency of the specific re-intake correction amount.

FIG. 14A is a graph illustrating a relationship between an engine speed and a secondary correction amount of a specific re-intake correction amount. As illustrated in this graph, the second correction unit 66 corrects to reduce the re-intake correction amount as the engine speed increases. That is, the correction to reduce the re-intake correction amount is performed when the engine speed is higher than a reference value Ref, and the correction to increase the re-intake correction amount is performed when the engine speed is lower than the reference value Ref. The engine speed can be calculated using, for example, a measured value of the crank angle sensor SN1.

Assuming that the valve overlap amount is constant, as the engine speed increases, the valve overlap time that is the time during which both the intake valve 11 and the exhaust valve 12 are open becomes shorter, and thus the return amount of burned gas to the cylinder 2 is reduced. The amount of intake air blown out of the intake port 9 decreases accordingly, so that the variation in the re-intake amount of intake air among the #1 to #4 cylinders 2 tends to decrease. Consequently, by performing a correction to reduce the re-intake correction amount as the engine speed increases, it is possible to accurately reduce a variation in A/F among the #1 to #4 cylinders 2.

<Atmospheric Pressure>

Figure 14B:
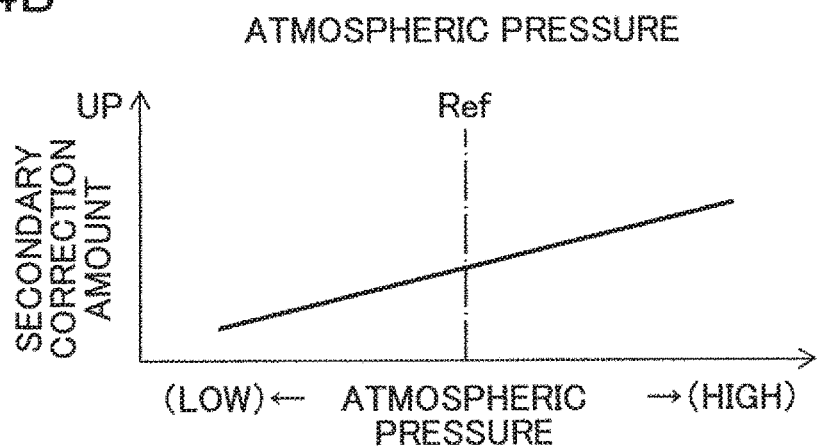

FIG. 14B is a graph illustrating a relationship between an atmospheric pressure and a secondary correction amount of a specific re-intake correction amount. As illustrated in this graph, the second correction unit 66 corrects to increase the re-intake correction amount with an increase in the atmospheric pressure. That is, the correction to increase the re-intake correction amount is performed when the atmospheric pressure is higher than a reference value Ref and the correction to reduce the re-intake correction amount is performed when the atmospheric pressure is lower than the reference value Ref. The atmospheric pressure can be recognized by a measured value of the atmospheric pressure sensor SN15.

When the atmospheric pressure increases, an exhaust pressure increases. Meanwhile, as the intake air pressure depends on the opening of the throttle valve 32, a supercharging pressure, and the like, the intake air pressure is hardly affected by the atmospheric pressure. The intake/exhaust differential pressure thus increases with the increase in the atmospheric pressure. Conversely, if the engine body 1 is placed in an environment of low atmospheric pressure during driving at high altitude, for example, the intake/exhaust differential pressure decreases. The larger the intake/exhaust differential pressure is, the larger the return amount of burned gas to the cylinder 2 is. The amount of intake air blown out of the intake port 9 increases accordingly, so that the variation in the re-intake amount of intake air among the #1 to #4 cylinders 2 tends to increase. Consequently, by performing a correction to increase the re-intake correction amount with the increase in the atmospheric pressure, it is possible to accurately reduce a variation in A/F among the #1 to #4 cylinders 2.

<Exhaust Gas Temperature>

Figure 14C:
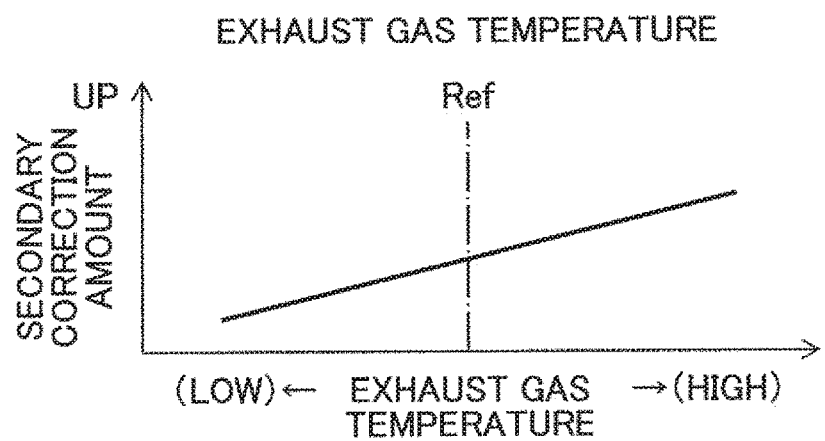

FIG. 14C is a graph illustrating a relationship between an exhaust gas temperature and a secondary correction amount of a specific re-intake correction amount. As illustrated in this graph, the second correction unit 66 corrects to increase the re-intake correction amount with an increase in the exhaust gas temperature. That is, the correction to increase the re-intake correction amount is performed when the exhaust gas temperature is higher than a reference value Ref and the correction to reduce the re-intake correction amount is performed when the exhaust gas temperature is lower than the reference value Ref. The exhaust gas temperature can be recognized by a measured value of the exhaust gas temperature sensor SN10.

When the exhaust gas temperature increases, the exhaust gas pressure increases. Meanwhile, the intake air pressure is hardly affected by the atmospheric pressure as described above. For this reason, the intake/exhaust differential pressure increases. The larger the intake/exhaust differential pressure is, the larger the return amount of burned gas to the cylinder is. The amount of intake air blown out of the intake port increases accordingly, so that the variation in the re-intake amount of intake air among the #1 to #4 cylinders 2 tends to increase. Consequently, by performing a correction to increase the re-intake correction amount with the increase in the exhaust gas temperature, it is possible to accurately reduce a variation in A/F among the #1 to #4 cylinders 2.

An example of the secondary correction of the specific re-intake correction amount (FIGS. 11A to 11D) in the operation area of SPCCI_$\lambda$=1 has been described above. Similarly, the secondary correction may be performed on the specific re-intake correction amount (FIGS. 12A to 12D) in the operation area of SPCCI_$\lambda$>1. However, in combustion of SPCCI_$\lambda$>1, the ratio of an air amount to fuel is considerably larger than that in a case of $\lambda$=1. Consequently, even if the re-intake amount of intake air varies to some extent, the variation in A/F (G/F) among the #1 to #4 cylinders 2 is not so apparent. Therefore, the secondary correction of the specific re-intake correction amount can be omitted in the operation area of SPCCI_$\lambda$>1.

[Process of Determining Fuel Injection Amount]

As illustrated in FIGS. 11A to 11D, the specific re-intake correction amount is determined in advance according to a BGR ratio. As the BGR ratio corresponds to an internal EGR amount, it is necessary to recognize the internal EGR amount in the current operating state in setting the re-intake correction amount. There is no sensor that directly measures the internal EGR amount, and thus it is necessary to calculate the internal EGR amount through computation by referring to sensor values of some of the sensors SN1 to SN15.

Figure 15:
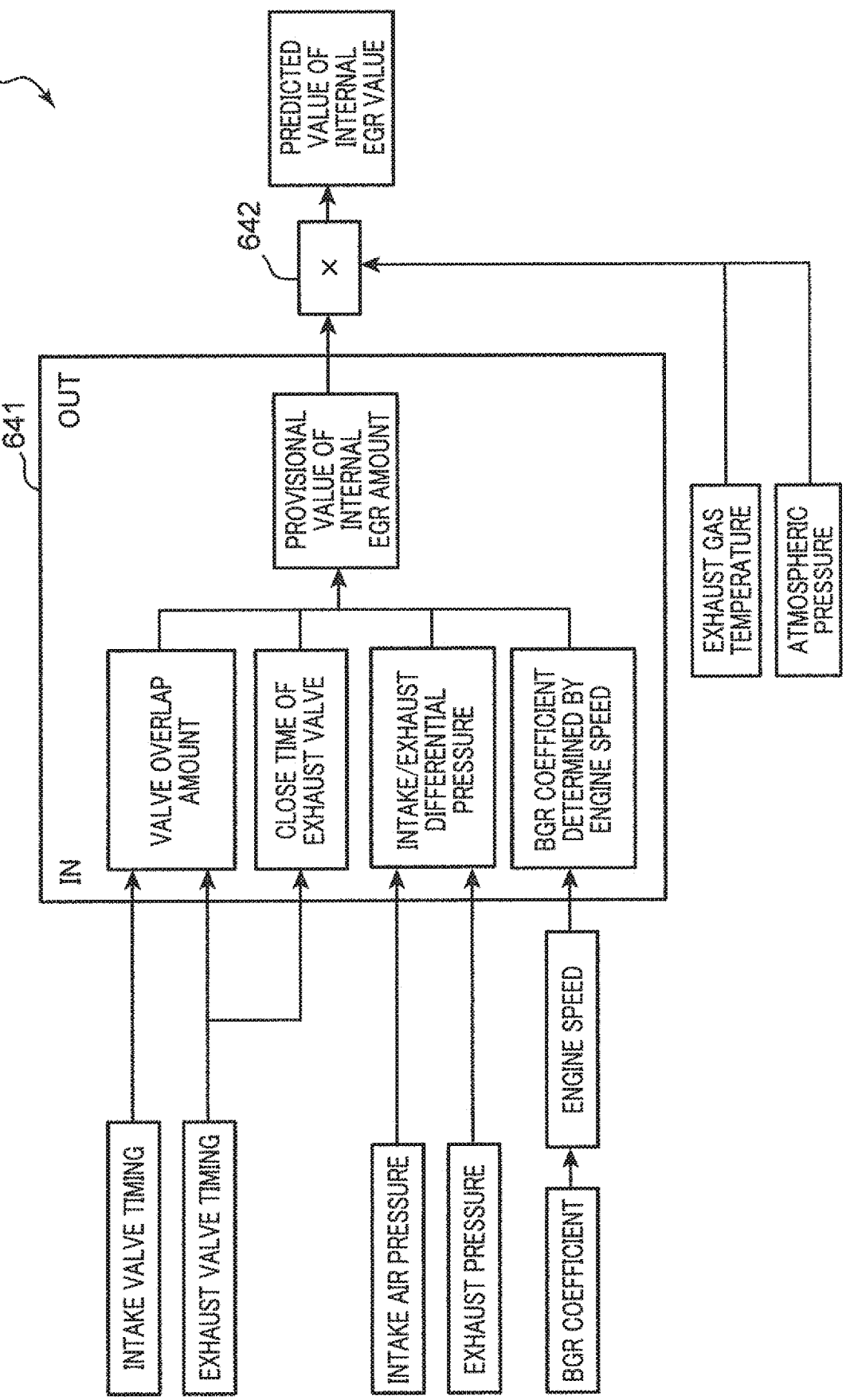
FIG. 15 is a schematic diagram illustrating a process of calculating a predicted value of an internal EGR amount.

In the present embodiment, the EGR prediction unit 64 calculates a predicted value of the internal EGR amount according to an operating state. FIG. 15 is a schematic diagram illustrating a process of calculating a predicted value of an internal EGR amount. The EGR prediction unit 64 includes a polynomial model computation unit 641 and a multiplier 642. The polynomial model computation unit 641 calculates a provisional value of the internal EGR amount by using the polynomial model stored in the storage unit 68. The polynomial model is a polynomial model having a valve overlap amount, a close time of the exhaust valve, an intake/exhaust differential pressure, and an engine speed as factors. The multiplier 642 calculates the predicted value of the internal EGR amount by multiplying the provisional value of the internal EGR amount by a coefficient determined by an exhaust gas temperature and a coefficient determined by an atmospheric pressure.

Open/close timings of the intake valve 11 and the exhaust valve 12, an intake air pressure, an exhaust pressure, and a combination value of a BGR coefficient and the engine speed are input to the polynomial model computation unit 641 as data. Data of the open/close timings of the intake valve 11 and the exhaust valve 12 is given based on measured values of the intake cam angle sensor SN12 and the exhaust cam angle sensor SN13. The intake air pressure is given based on measured values of the first intake air pressure sensor SN6 and the second intake air pressure sensor SN8. The exhaust pressure is given as a computation value that is calculated using, for example, an exhaust amount estimated from an intake air amount measured by the air flow sensor SN4, an exhaust gas temperature measured by the exhaust gas temperature sensor SN10, and the like. The BGR coefficient is a coefficient determined in advance in association with the BGR ratio and the engine speed. The engine speed is given based on a measured value of the crank angle sensor SN1.

The polynomial model computation unit 641 derives a valve overlap amount from the open time of the intake valve 11 and the close time of the exhaust valve 12 in the data of the open/close timings of the intake valve 11 and the exhaust valve 12. The close time of the exhaust valve 12 is also obtained from the data about the open/close timing of the exhaust valve 12. The polynomial model computation unit 641 calculates an intake/exhaust differential pressure from the intake air pressure and the exhaust pressure. Further, the polynomial model computation unit 641 specifies the BGR coefficient determined by the rotation speed by the BGR coefficient input and the current engine speed. This BGR coefficient is a coefficient corresponding to a valve overlap time.

The valve overlap amount, the close time of the exhaust valve 12, the intake/exhaust differential pressure, and the engine speed (valve overlap time) are all variables closely related to the return amount of burned gas discharged from the exhaust port 10 to the cylinder 2, that is, the internal EGR amount. The polynomial model computation unit 641 provisionally derives an estimated value of the internal EGR amount by using a polynomial regression model represented by a polynomial of these variables.

The value output by the polynomial model computation unit 641 is handled as a provisional value because by further reflecting the atmospheric pressure and the exhaust gas temperature that may affect the return amount of burned gas, the predicted value of the internal EGR amount is derived. The multiplier 642 multiplies the provisional value of the internal EGR amount output by the polynomial model computation unit 641 by a predetermined coefficient in association with the exhaust gas temperature and a predetermined coefficient in association with the atmospheric pressure to calculate the predicted value of the internal EGR amount.

Figure 16:
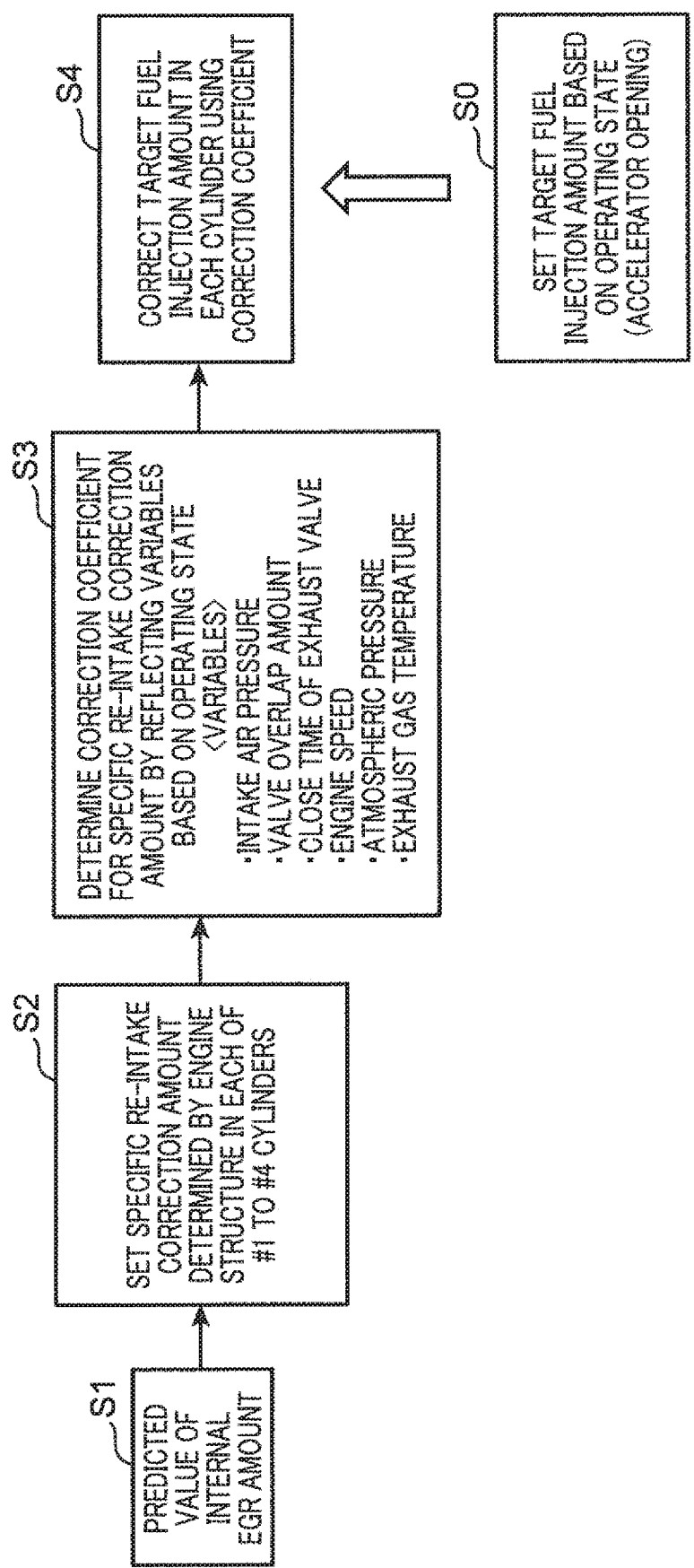
FIG. 16 is an explanatory diagram illustrating a procedure for correcting a fuel injection amount.

FIG. 16 is an explanatory diagram illustrating a procedure for correcting a target fuel injection amount (step S0) set by the injection setting unit 63 according to an operating state such as an accelerator opening. First, the EGR prediction unit 64 calculates a predicted value of an internal EGR amount by the method described above (Step S1). Next, as illustrated in FIGS. 11A to 11D, the first correction unit 65 sets a specific re-intake correction amount determined by an engine structure in each of the #1 to #4 cylinders 2 (step S2).

The second correction unit 66 then determines a correction coefficient for secondarily correcting the specific re-intake correction amount set by the first correction unit 65 by referring to variables based on the operating state (step S3). As illustrated in FIGS. 13A to 13C and FIGS. 14A to 14C, the variables are an intake air pressure, a valve overlap amount, a close time of the exhaust valve 12, an engine speed, an atmospheric pressure, and an exhaust gas temperature. The second correction unit 66 corrects the target fuel injection amount (step S0) set based on the accelerator opening in each of the #1 to #4 cylinders 2 by using the correction coefficient determined (step S4).

[Flow of Combustion Control]

Figure 17:
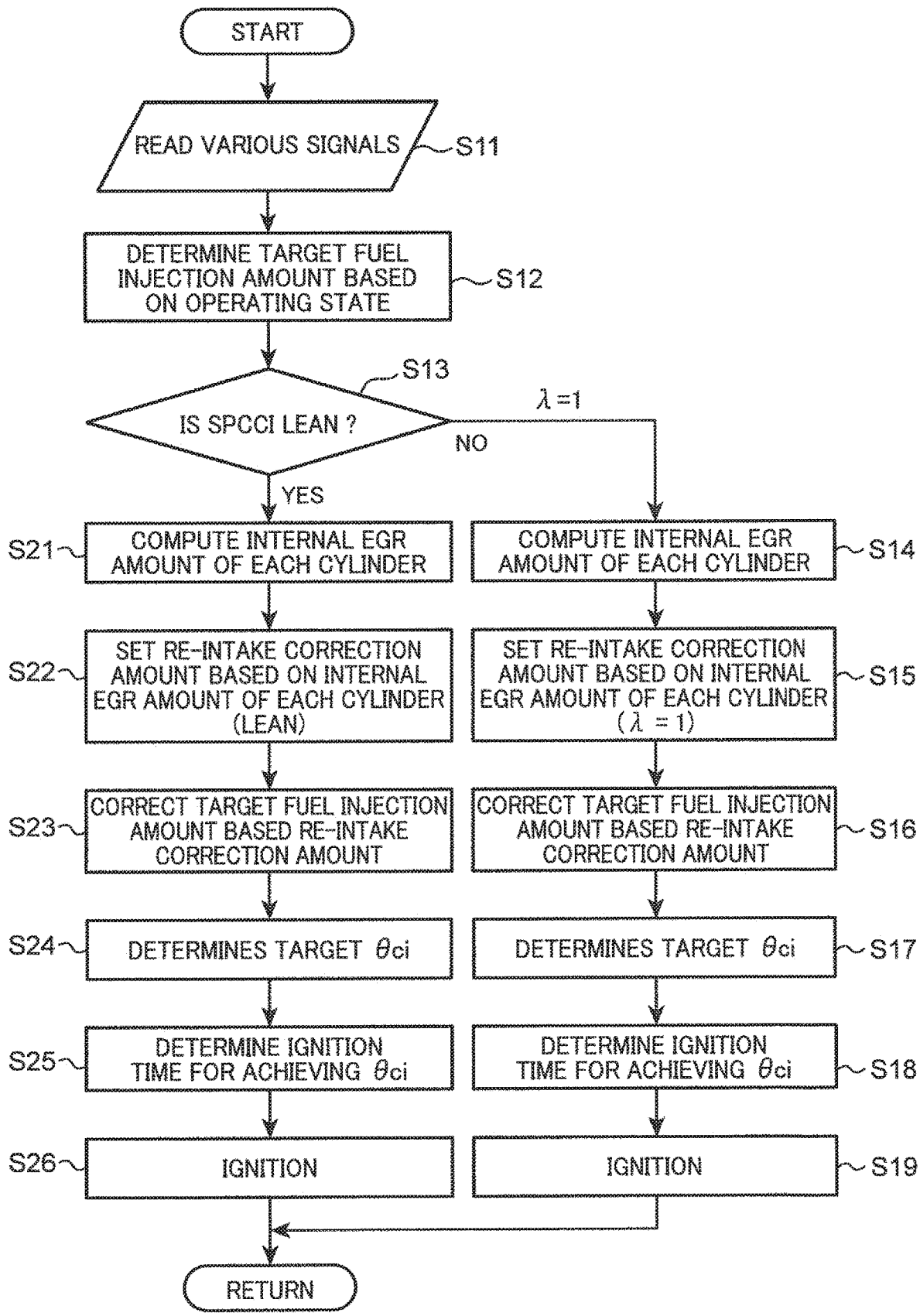
FIG. 17 is a flowchart illustrating a specific example of combustion control according to the present embodiment.

FIG. 17 is a flowchart illustrating a specific example of combustion control executed by the processor 60 of the present embodiment. The fuel injection control unit 61 reads various signals from the sensors SN1 to SN15 illustrated in FIG. 6 and other sensors to obtain information about an operating state of the engine body 1 and environmental information affecting combustion conditions (step S11).

The injection setting unit 63 determines a target fuel injection amount according to an accelerator depression amount detected by the accelerator opening sensor SN14 (Step S12).

Next, based on the information obtained at step S1, the operation state determination unit 62 specifies which area in the operation maps Q1 to Q3 illustrated in FIGS. 7A to 7C the current operation point corresponds to (step S13). While there may be various operation points, options for performing a re-intake correction are simply given. That is, it is determined whether the operation point is, for example, in an area where SPCCI combustion (SPCCI_$\lambda$>1) under a lean environment is performed, the SPCCI combustion being employed in the first area A1 of the first operation map Q1 or, for example, in an area where SPCCI combustion (SPCCI_$\lambda$=1) under an environment that substantially matches a stoichiometric air-fuel ratio is performed, the SPCCI combustion being employed in the sixth area B1 (specific region B11) of the second operation map Q2.

When the operation point is in the operation area of SPCCI_$\lambda$=1 (NO at step S13), the EGR prediction unit 64 performs a computation to calculate a predicted value of an internal EGR amount for each of the #1 to #4 cylinders 2 using a polynomial model (step S14). Next, the re-intake correction amount of each of the cylinders 2 is determined according to the internal EGR amount of each of the #1 to #4 cylinders 2 (step S15). In the operation area of SPCCI_$\lambda$=1, the re-intake correction amount is determined in two stages. Specifically, as described with reference to FIG. 16, the first correction unit 65 sets a specific re-intake correction amount of each of the #1 to #4 cylinders 2 according to the predicted value of the internal EGR amount (step S2 in FIG. 16). Next, the second correction unit 66 sets a new re-intake correction amount by secondarily correcting the specific re-intake correction amount set by the first correction unit 65 by referring to variables based on the operating state (step S3 in FIG. 16). The injection setting unit 63 corrects the target fuel injection amount set at step S12 using the new re-intake correction amount (step S16).

Next, the fuel injection control unit 61 determines a target θci in order to achieve good SPCCI combustion (step S17). As described above, the target θci is a crank angle at the inflection point X that appears when the combustion mode switches from SI combustion to CI combustion (see FIG. 8). The ignition control unit 67 then determines an ignition time of the spark plug 16 for achieving the target θci determined (step S18). The ignition control unit 67 causes the spark plug 16 to perform an ignition operation at the ignition time determined (step S19).

When the operation point is in the operation area of SPCCI_λ>1 (YES at step S13) is the same as the case of SPCCI_λ=1 except for a step of setting the re-intake correction amount (step S22). The EGR prediction unit 64 calculates a predicted value of the internal EGR amount for each of the #1 to #4 cylinders 2 using a polynomial model (step S21). Next, the re-intake correction amount of each of the cylinders 2 is determined according to the internal EGR amount of each of the #1 to #4 cylinders 2 (step S22). In the operation area of SPCCI_λ>1, the secondary correction is not performed, and the specific re-intake correction amount in FIGS. 12A to 12D is directly used as the correction coefficient. That is, the first correction unit 65 sets the specific re-intake correction amount of each of the #1 to #4 cylinders 2 according to the predicted value of the internal EGR amount.

The injection setting unit 63 corrects the target fuel injection amount set at step S12 using the re-intake correction amount set at step S22 (step S23). Next, the fuel injection control unit 61 determines the target θci in SPCCI combustion (step S24). The ignition control unit 67 then determines the ignition time of the spark plug 16 for achieving the target θci determined (step S25), and causes the spark plug 16 to perform the ignition operation at the ignition time (step S26).

[Operations and Effects]

According to the combustion control device for an engine according to the present embodiment described above, even if the re-intake amount of intake air in internal EGR varies between a plurality of the cylinders 2 for some reason, the target fuel injection amount is corrected in each cylinder 2 by a re-intake correction amount. For example, even when there is a specific difference in the re-intake amount between the cylinders 2 due to structural characteristics of an intake passage, the air-fuel ratio can be adjusted in each cylinder 2 using the re-intake correction amount set by the first correction unit 65. The air-fuel ratios of the cylinders 2 can thus be matched.

Further, the second correction unit 66 secondarily corrects the re-intake correction amount set by the first correction unit 65 according to variables such as an intake air pressure, a valve overlap amount, a close time of the exhaust valve 12, an engine speed, an atmospheric pressure, and an exhaust gas temperature. These variables affect the amount of burned gas returned to the cylinders by the internal EGR, and also affect the amount of intake air blown out of the intake port 9. When the amount of blow-out intake air changes, the mode of re-intake may also change. Consequently, as the second correction unit 66 further corrects the re-intake correction amount according to the variables described above instead of fixedly setting the re-intake correction amount, the air-fuel ratio can be accurately adjusted in each cylinder 2. As a result, the air-fuel ratios of the cylinders 2 can be accurately matched by reflecting an operating state.

In particular, the independent intake passage 37 of the present embodiment is set to be short enough to allow intake air blown out of the intake port 9 to reach the surge tank 36 during a valve overlap period. Although the mountability of the engine body 1 can be improved, for example, intake air once discharged from the intake port 9 of the #1 cylinder 2 is easily re-intaken not to the #1 cylinder 2 itself but to the #2 cylinder 2 through the surge tank 36. However, even if such a re-intake imbalance occurs between the cylinders 2, the target fuel injection amount is corrected in each cylinder 2 by the re-intake correction amounts for the first correction unit 65 and the second correction unit 66. The variation in air-fuel ratio between the cylinders 2 can thus be reduced.

[Modifications]

While the embodiment of the present invention has been described above, the present invention is not limited to the embodiment, and the following modifications are possible, for example.

(1) A case is assumed in the embodiment where a specific variation in the re-intake amount of intake air is generated due to the structure of the intake passage 30 in which the independent intake passage 37 is very short. This is merely an example, and the present invention may be applied to, for example, a case where the specific re-intake amount varies due to a difference in the path length of the independent intake passage 37 among the #1 to #4 cylinders 2, or due to other factors (arrangement of valves and the like).

(2) The embodiment illustrates the center intake structure in which the third passage 303 that is an intake passage immediately upstream of the surge tank 36 introduces intake air to the central area of the surge tank 36 in a longitudinal direction. The mode of introducing intake air to the surge tank 36 is not limited to the center air intake structure. For example, as in the exhaust passage 40 (FIG. 5), the end uneven intake structure in which intake air is introduced from a position shifted to a side of the #1 cylinder 2 or a side of the #4 cylinder 2 may be adopted. In this case, the target fuel injection amount may be corrected so that the air-fuel ratio is on a rich side at a position close to the #1 cylinder 2 or the #4 cylinder 2 and is on a lean side at a position far from the #1 cylinder 2 or the #4 cylinder 2.

(3) The embodiment illustrates the end uneven exhaust structure of the exhaust manifold 42 having the shortest flow path length for the #1 cylinder 2, and the longer flow path length for the #2, #3, and #4 cylinders 2 closer to the end. Alternatively, as in the intake passage 30, the structure in which the exhaust pipe 43 is placed at the center of the exhaust manifold 42 in a width direction or the structure in which the independent exhaust pipes 44_#1 to #4 have the same flow path length may be adopted.

(4) The above embodiment describes an example in which the EGR prediction unit 64 predicts an internal EGR amount using the polynomial model illustrated in FIG. 15. Instead of using the polynomial model, for example, table data in which operation conditions are associated with the internal EGR amount may be stored in the storage unit 68 in advance, and the table data may be read when the internal EGR amount is predicted.

The specific embodiments described above disclose a structure of a combustion chamber of an engine, the structure having the following configuration.

According to one aspect of the present invention, there is provided a combustion control device for an engine including a plurality of cylinders, a surge tank disposed in an intake path to the cylinders, an independent intake passage connecting the surge tank and an intake port of each of the cylinders, a fuel injection valve that is disposed for each of the cylinders and that supplies fuel into each of the cylinders, and a control unit that controls a fuel injection amount of each of the fuel injection valves according to an engine operating state. The control unit corrects a target fuel injection amount of each of the cylinders, the target fuel injection amount being determined according to the engine operating state, based on a re-intake correction amount set in each of the cylinders according to a re-intake amount of intake air from the intake port in internal EGR in each of the cylinders.

According to another aspect of the present invention, there is provided a combustion control method for an engine, the engine including a plurality of cylinders, a surge tank disposed in an intake path to the cylinders, an independent intake passage connecting the surge tank and an intake port of each of the cylinders, and a fuel injection valve that is disposed for each of the cylinders and that supplies fuel into each of the cylinders, the combustion control method including setting a fuel injection amount of each of the fuel injection valves to a target fuel injection amount of each of the cylinders, the target fuel injection amount being determined according to an engine operating state, and correcting the target fuel injection amount based on a re-intake correction amount set in each of the cylinders according to a re-intake amount from the intake port in internal EGR in each of the cylinders.

According to the combustion control device and the combustion control method, even if the re-intake amount of intake air in the internal EGR varies between a plurality of the cylinders for some reason, the target fuel injection amount is corrected in each cylinder using the re-intake correction amount. That is, the air-fuel ratio can be adjusted in each cylinder by setting the re-intake correction amount, and thus the air-fuel ratios of the cylinders can be matched.

In the combustion control device for an engine, the engine includes an intake valve that opens and closes an intake port and an exhaust valve that opens and closes an exhaust port, the internal EGR is achieved by setting a valve overlap in which both the intake valve and the exhaust valve are open, and the independent intake passage preferably is set to have a length that allows intake air blown out from the intake port to reach the surge tank during a period of the valve overlap.

According to this combustion control device, the independent intake passage is set to a length that allows the intake air discharged from the intake port to reach the surge tank by performing the internal EGR. Although the mountability of the engine can be improved, intake air once discharged from the intake port of one cylinder may be re-intaken not to the one cylinder itself but to another cylinder through the surge tank. That is, the re-intake amount of the intake air may differ among the cylinders. However, even if such a difference in the re-intake amount is generated, the target fuel injection amount is corrected in each cylinder using the re-intake correction amount. A variation in air-fuel ratio between the cylinders can thus be reduced.

In the combustion control device for an engine, the control unit preferably sets the re-intake correction amount to be smaller as an intake air pressure increases.

When the intake air pressure is high, the intake/exhaust differential pressure is reduced and thus the amount of intake air blown out of the intake port itself is reduced. Consequently, the re-intake amount is reduced accordingly. The variation in the re-intake amount between the cylinders is thus reduced. By setting the re-intake correction amount to be smaller as the intake air pressure increases, the target fuel injection amount can be corrected according to an actual state.

In the combustion control device for an engine, among the cylinders, a first cylinder in which a re-intake amount of intake air from the intake port in the internal EGR is a predetermined amount and a second cylinder in which the re-intake amount is larger than the re-intake amount of the first cylinder are present, and the control unit preferably corrects the target fuel injection amount so that an air-fuel ratio of the first cylinder is on a lean side and an air-fuel ratio of the second cylinder is on a rich side.

According to this combustion control device, the target fuel injection amount is corrected so that the air-fuel ratio of the first cylinder is on the lean side, that is, the fuel injection amount of the first cylinder in which the re-intake amount of intake air from the intake port is relatively small is reduced, and the air-fuel ratio of the second cylinder is on the rich side, that is, the fuel injection amount of the second cylinder in which the re-intake amount is relatively large is increased. The fuel injection amount can thus be corrected in each cylinder according to engine-specific re-intake characteristics, and air-fuel ratios of all the cylinders can have a constant value (for example, $\lambda=1$).

In the combustion control device for an engine, the control unit is capable of switching an air-fuel ratio of an air-fuel mixture generated in each of the cylinders between a stoichiometric air-fuel ratio and an air-fuel ratio leaner than the stoichiometric air-fuel ratio, and in setting the air-fuel ratio to the stoichiometric air-fuel ratio, the control unit preferably corrects the target fuel injection amount so that an air-fuel ratio of the first cylinder is on a lean side and an air-fuel ratio of the second cylinder is on a rich side.

In the combustion control device for an engine, the engine is a four-cylinder engine in which four cylinders are arranged in a line, the independent intake passages are arranged in a line in a direction in which the cylinders are arranged, and the surge tank includes a flow path space that is long in a direction in which the cylinders are arranged, the surge tank is connected to an upstream intake path that introduces intake air to a central area of the surge tank in a longitudinal direction, and the control unit preferably corrects the target fuel injection amount so that among the four cylinders arranged in a line, air-fuel ratios of end-side cylinders located at both ends are on a lean side and air-fuel ratios of two center-side cylinders sandwiched between the end-side cylinders are on a rich side.

In the configuration of the intake system described above, among the four cylinders, the end-side cylinder has a relatively small re-intake amount of intake air from the intake port, and the center-side cylinder has a relatively large re-intake amount. In other words, a part of intake air once discharged from the intake port of the end-side cylinder by the internal EGR tends to be re-intaken to the intake port of the center-side cylinder. According to this combustion control device, the target fuel injection amount is corrected so that the air-fuel ratio is on the lean side (fuel injection amount is reduced) in the end-side cylinder in which the re-intake amount of intake air is relatively small, and the air-fuel ratio is on the rich side (fuel injection amount is increased) in the center-side cylinder in which the re-intake amount is relatively large. The fuel injection amount can thus be corrected in each cylinder according to specific re-intake characteristics based on the configuration of the intake system, and air-fuel ratios of the four cylinders can have a constant value (for example, $\lambda=1$).

In the combustion control device for an engine, among the cylinders, a third cylinder in which a re-intake amount of burned gas from an exhaust port of the third cylinder in the internal EGR is a predetermined amount and a fourth cylinder in which the re-intake amount is larger than the re-intake amount of the third cylinder are present, the control unit is capable of switching an air-fuel ratio of an air-fuel mixture generated in each of the cylinders between a stoichiometric air-fuel ratio and an air-fuel ratio leaner than the stoichiometric air-fuel ratio, and in setting the air-fuel ratio to the air-fuel ratio leaner than the stoichiometric air-fuel ratio, the control unit preferably corrects the target fuel injection amount so that an air-fuel ratio of the third cylinder is on a lean side and an air-fuel ratio of the fourth cylinder is on a rich side.

According to this combustion control device, the target fuel injection amount is corrected so that the air-fuel ratio of the third cylinder is on the lean side, that is, the fuel injection amount of the third cylinder in which the re-intake amount of burned gas from the exhaust port is relatively small is reduced, and the air-fuel ratio of the fourth cylinder is on the rich side, that is, the fuel injection amount of the fourth cylinder in which the re-intake amount is relatively large is increased. The fuel injection amount can thus be corrected in each cylinder according to engine-specific re-intake characteristics, and gas air-fuel ratios of all the cylinders can have a constant value.

In the combustion control device for an engine, the engine is a four-cylinder engine in which four cylinders are arranged in a line, and includes an exhaust collector part that collects exhaust gas discharged from an exhaust port of each of the four cylinders and a downstream exhaust path that guides exhaust gas downstream from the exhaust collector part, the exhaust collector part includes an exhaust path in which one-end-side cylinder located at one end among the four cylinders arranged in a line has a shortest path from an exhaust port to the downstream exhaust path, and a cylinder closer to another end side has a longer path from the exhaust port to the downstream exhaust path, the control unit is capable of switching an air-fuel ratio of an air-fuel mixture generated in each of the cylinders between a stoichiometric air-fuel ratio and an air-fuel ratio leaner than the stoichiometric air-fuel ratio, and in setting the air-fuel ratio to the air-fuel ratio leaner than the stoichiometric air-fuel ratio, the control unit preferably corrects the target fuel injection amount so that an air-fuel ratio of the one-end-side cylinder is on a rich side and air-fuel ratios of remaining three cylinders are on a lean side.

In the configuration of the exhaust system described above, among the four cylinders, the one-end-side cylinder has a relatively large re-intake amount of burned gas from the exhaust port, and the remaining three cylinders have a relatively small re-intake amount. In other words, a part of burned gas once discharged from the exhaust ports of the three cylinders by the internal EGR tends to be re-intaken to the exhaust port of the one-end-side cylinder. According to this combustion control device, the target fuel injection amount is corrected so that the air-fuel ratio is on the rich side (fuel injection amount is increased) in the one-end-side cylinder in which the re-intake amount of burned gas is relatively large, and the air-fuel ratio is on the lean side (fuel injection amount is reduced) in the three cylinders in which the re-intake amount is relatively small. The fuel injection amount can thus be corrected in each cylinder according to specific re-intake characteristics based on the configuration of the exhaust system, and gas air-fuel ratios of the four cylinders can have a constant value.

In the combustion control device for an engine, the control unit preferably sets the re-intake correction amount based on the re-intake amount calculated using a polynomial model that includes at least a valve overlap amount at which an intake valve and an exhaust valve of each of the cylinders are both open, an intake/exhaust differential pressure, a close time of the exhaust valve, and an engine speed as factors.

According to this combustion control device, the control unit can easily and accurately set the re-intake correction amount using the polynomial model.

According to the present invention described above, it is possible to provide a combustion control device for an engine in which internal EGR is performed, the combustion control device being capable of reducing a variation in air-fuel ratio between a plurality of cylinders.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A combustion control device for an engine, comprising:
   a plurality of cylinders;
   a surge tank disposed in an intake path to the cylinders;
   an independent intake passage connecting the surge tank and an intake port of each of the cylinders;
   a fuel injection valve that is disposed for each of the cylinders and that supplies fuel into each of the cylinders; and
   a control unit that controls a fuel injection amount of each of the fuel injection valves according to an engine operating state,
   wherein the control unit corrects a target fuel injection amount of each of the cylinders, the target fuel injection amount being determined according to the engine operating state, based on a re-intake correction amount set in each of the cylinders according to a re-intake amount of intake air from the intake port in internal EGR in each of the cylinders.

2. The combustion control device for an engine according to claim 1, wherein
   the engine includes an intake valve that opens and closes an intake port of each of the cylinders and an exhaust valve that opens and closes an exhaust port of each of the cylinders, the internal EGR is achieved by setting a valve overlap in which both the intake valve and the exhaust valve are open, and
   the independent intake passage is set to have a length that allows intake air blown out from the intake port to reach the surge tank during a period of the valve overlap.

3. The combustion control device for an engine according to claim 1, wherein
   the control unit sets the re-intake correction amount to be smaller as an intake air pressure increases.

4. The combustion control device for an engine according to claim 1, wherein
   among the cylinders, a first cylinder in which a re-intake amount of intake air from the intake port in the internal EGR is a predetermined amount and a second cylinder in which the re-intake amount is larger than the re-intake amount of the first cylinder are present, and
   the control unit corrects the target fuel injection amount so that an air-fuel ratio of the first cylinder is on a lean side and an air-fuel ratio of the second cylinder is on a rich side.

5. The combustion control device for an engine according to claim 4, wherein the control unit is capable of switching an air-fuel ratio of an air-fuel mixture generated in each of the cylinders between a stoichiometric air-fuel ratio and an air-fuel ratio leaner than the stoichiometric air-fuel ratio, and in setting the air-fuel ratio to the stoichiometric air-fuel ratio, the control unit corrects the target fuel injection amount so that an air-fuel ratio of the first cylinder is on a lean side and an air-fuel ratio of the second cylinder is on a rich side.

6. The combustion control device for an engine according to claim 1, wherein the engine is a four-cylinder engine in which four cylinders are arranged in a line, the independent intake passages are arranged in a line in a direction in which the cylinders are arranged, and the surge tank includes a flow path space that is long in a direction in which the cylinders are arranged, the surge tank is connected to an upstream intake path that introduces intake air to a central area of the surge tank in a longitudinal direction, and the control unit corrects the target fuel injection amount so that among the four cylinders arranged in a line, air-fuel ratios of end-side cylinders located at both ends are on a lean side and air-fuel ratios of two center-side cylinders sandwiched between the end-side cylinders are on a rich side.

7. The combustion control device for an engine according to claim 1, wherein among the cylinders, a third cylinder in which a re-intake amount of burned gas from an exhaust port of the third cylinder in the internal EGR is a predetermined amount and a fourth cylinder in which the re-intake amount is larger than the re-intake amount of the third cylinder are present, the control unit is capable of switching an air-fuel ratio of an air-fuel mixture generated in each of the cylinders between a stoichiometric air-fuel ratio and an air-fuel ratio leaner than the stoichiometric air-fuel ratio, and in setting the air-fuel ratio to the air-fuel ratio leaner than the stoichiometric air-fuel ratio, the control unit corrects the target fuel injection amount so that an air-fuel ratio of the third cylinder is on a lean side and an air-fuel ratio of the fourth cylinder is on a rich side.

8. The combustion control device for an engine according to claim 1, wherein the engine is a four-cylinder engine in which four cylinders are arranged in a line, and includes an exhaust collector part that collects exhaust gas discharged from an exhaust port of each of the four cylinders and a downstream exhaust path that guides exhaust gas downstream from the exhaust collector part, the exhaust collector part includes an exhaust path in which one-end-side cylinder located at one end among the four cylinders arranged in a line has a shortest path from an exhaust port to the downstream exhaust path, and a cylinder closer to another end side has a longer path from the exhaust port to the downstream exhaust path, the control unit is capable of switching an air-fuel ratio of an air-fuel mixture generated in each of the cylinders between a stoichiometric air-fuel ratio and an air-fuel ratio leaner than the stoichiometric air-fuel ratio, and in setting the air-fuel ratio to the air-fuel ratio leaner than the stoichiometric air-fuel ratio, the control unit corrects the target fuel injection amount so that an air-fuel ratio of the one-end-side cylinder is on a rich side and air-fuel ratios of remaining three cylinders are on a lean side.

9. The combustion control device for an engine according to claim 1, wherein the control unit sets the re-intake correction amount based on the re-intake amount calculated using a polynomial model that includes at least a valve overlap amount at which an intake valve and an exhaust valve of each of the cylinders are both open, an intake/exhaust differential pressure, a close time of the exhaust valve, and an engine speed as factors.

10. A combustion control method for an engine, the engine including a plurality of cylinders, a surge tank disposed in an intake path to the cylinders, an independent intake passage connecting the surge tank and an intake port of each of the cylinders, and a fuel injection valve that is disposed for each of the cylinders and that supplies fuel into each of the cylinders, the combustion control method comprising:

setting a fuel injection amount of each of the fuel injection valves to a target fuel injection amount of each of the cylinders, the target fuel injection amount being determined according to an engine operating state; and correcting the target fuel injection amount based on a re-intake correction amount set in each of the cylinders according to a re-intake amount from the intake port in internal EGR in each of the cylinders.

* * * * *